US009261001B2

(12) United States Patent
Matsumoto et al.

(10) Patent No.: US 9,261,001 B2
(45) Date of Patent: Feb. 16, 2016

(54) FAILURE DETERMINATION SYSTEM OF EXHAUST GAS PURIFICATION APPARATUS

(71) Applicant: TOYOTA JIDOSHA KABUSHIKI KAISHA, Toyota-shi, Aichi (JP)

(72) Inventors: Arifumi Matsumoto, Shizuoka-ken (JP); Toru Kidokoro, Kanagawa-ken (JP); Taiga Hagimoto, Shizuoka-ken (JP); Kazuya Takaoka, Shizuoka-ken (JP); Hirokazu Nishijima, Shizuoka-ken (JP); Yuki Terui, Aichi-ken (JP); Akifumi Uozumi, Shizuoka-ken (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/424,144

(22) PCT Filed: Dec. 6, 2013

(86) PCT No.: PCT/JP2013/082847
§ 371 (c)(1),
(2) Date: Feb. 26, 2015

(87) PCT Pub. No.: WO2014/088101
PCT Pub. Date: Jun. 12, 2014

(65) Prior Publication Data
US 2015/0275733 A1 Oct. 1, 2015

(30) Foreign Application Priority Data

Dec. 6, 2012 (JP) ................... 2012-267325
Dec. 6, 2012 (JP) ................... 2012-267326

(51) Int. Cl.
*F01N 11/00* (2006.01)
*F01N 3/20* (2006.01)

(52) U.S. Cl.
CPC .............. *F01N 3/2066* (2013.01); *F01N 11/00* (2013.01); *F01N 3/208* (2013.01);
(Continued)

(58) Field of Classification Search
CPC ..... F01N 3/208; F01N 11/00; F01N 2550/02; F01N 2550/03; F01N 2550/05; F01N 2560/021; F01N 2560/026; F01N 2610/02; F01N 2610/1453; F01N 2900/1402; F01N 2900/1602; F01N 2900/1616; F01N 2900/1621; F01N 2900/1622; F01N 2900/1806
USPC .......................... 60/276, 277, 286, 295, 301
See application file for complete search history.

(56) References Cited

U.S. PATENT DOCUMENTS

2008/0178656 A1   7/2008 Nieuwstadt et al.
2010/0180576 A1   7/2010 Wang et al.

FOREIGN PATENT DOCUMENTS

JP   2003-293743   10/2003
JP   2008-190529   8/2008
(Continued)

*Primary Examiner* — Thomas Denion
*Assistant Examiner* — Jorge Leon, Jr.
(74) *Attorney, Agent, or Firm* — Finnegan, Henderson, Farabow, Garrett & Dunner, LLP

(57) ABSTRACT

In a failure determination system that performs failure determination of an exhaust gas purification apparatus having a NOx selective catalytic reduction catalyst (NOx catalyst) that is disposed in an exhaust passage of an internal combustion engine and uses ammonia as a reducing agent, the failure determination of the exhaust gas purification apparatus is performed by a failure determination unit, based on a detected value of a NOx sensor that detects NOx in exhaust gas. Then, based on an adsorption amount difference at assumed failure that is the difference between an ammonia equilibrium adsorption amount in the NOx catalyst in an equilibrium state of ammonia adsorption, assuming that the exhaust gas purification apparatus is in a predefined failure state, and an actual ammonia adsorption amount in the NOx catalyst, the failure determination itself by the failure determination unit is inhibited or the use of the NOx sensor in the failure determination is restricted. Accordingly, in the failure determination system of exhaust gas purification apparatus having the NOx selective catalytic reduction catalyst, erroneous determinations at the time of failure determination are suppressed, thereby further improving the accuracy of the failure determination.

15 Claims, 11 Drawing Sheets

(52) U.S. Cl.
CPC .............................. *F01N 2550/02* (2013.01);
*F01N 2550/03* (2013.01); *F01N 2550/05* (2013.01); *F01N 2560/021* (2013.01); *F01N 2560/026* (2013.01); *F01N 2610/02* (2013.01); *F01N 2610/1453* (2013.01); *F01N 2900/1402* (2013.01); *F01N 2900/1602* (2013.01); *F01N 2900/1616* (2013.01); *F01N 2900/1621* (2013.01); *F01N 2900/1622* (2013.01); *F01N 2900/1806* (2013.01)

(56) References Cited

FOREIGN PATENT DOCUMENTS

| | | |
|---|---|---|
| JP | 2010-95221 | 4/2010 |
| JP | 2011-220142 | 11/2011 |

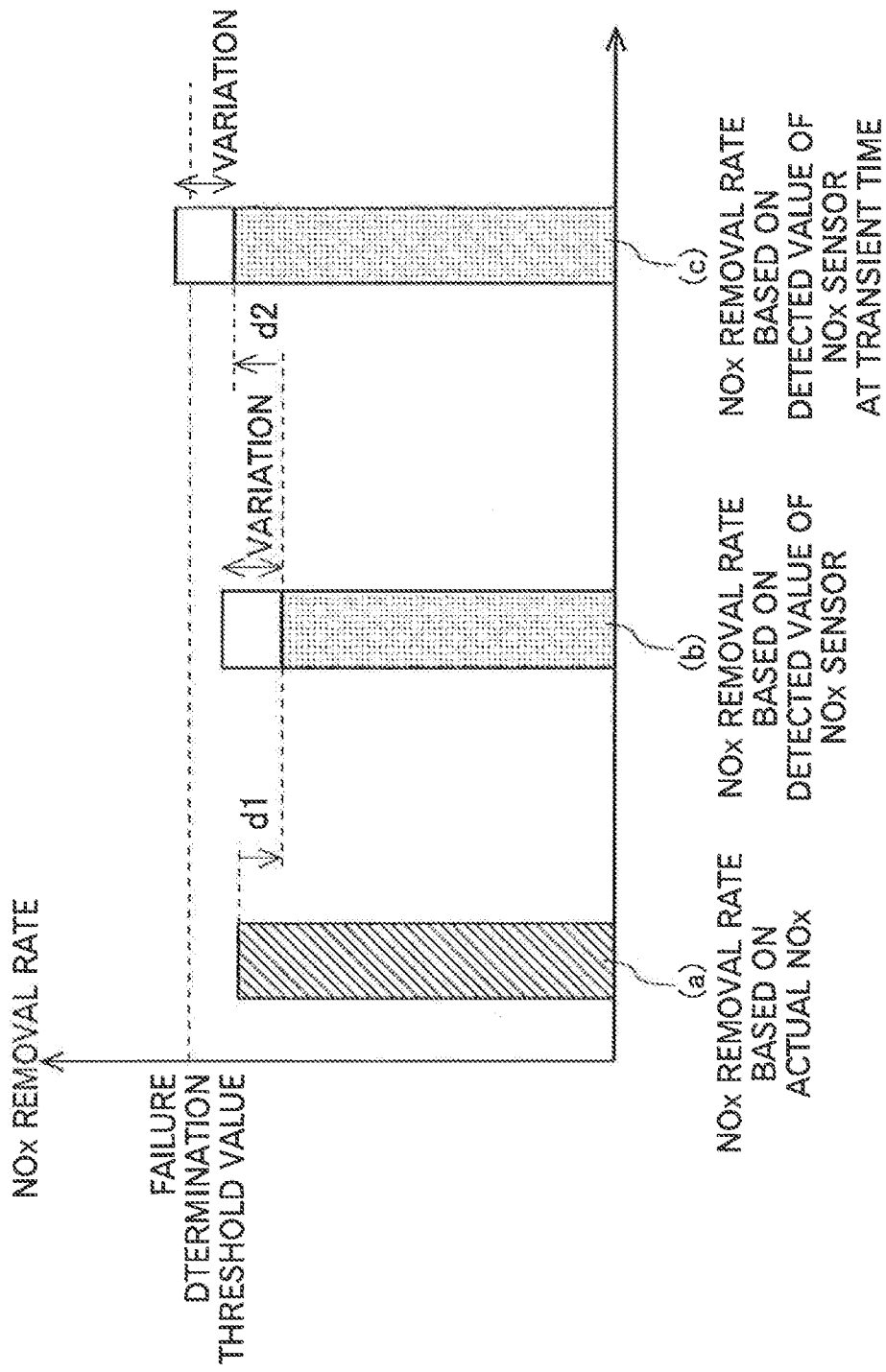

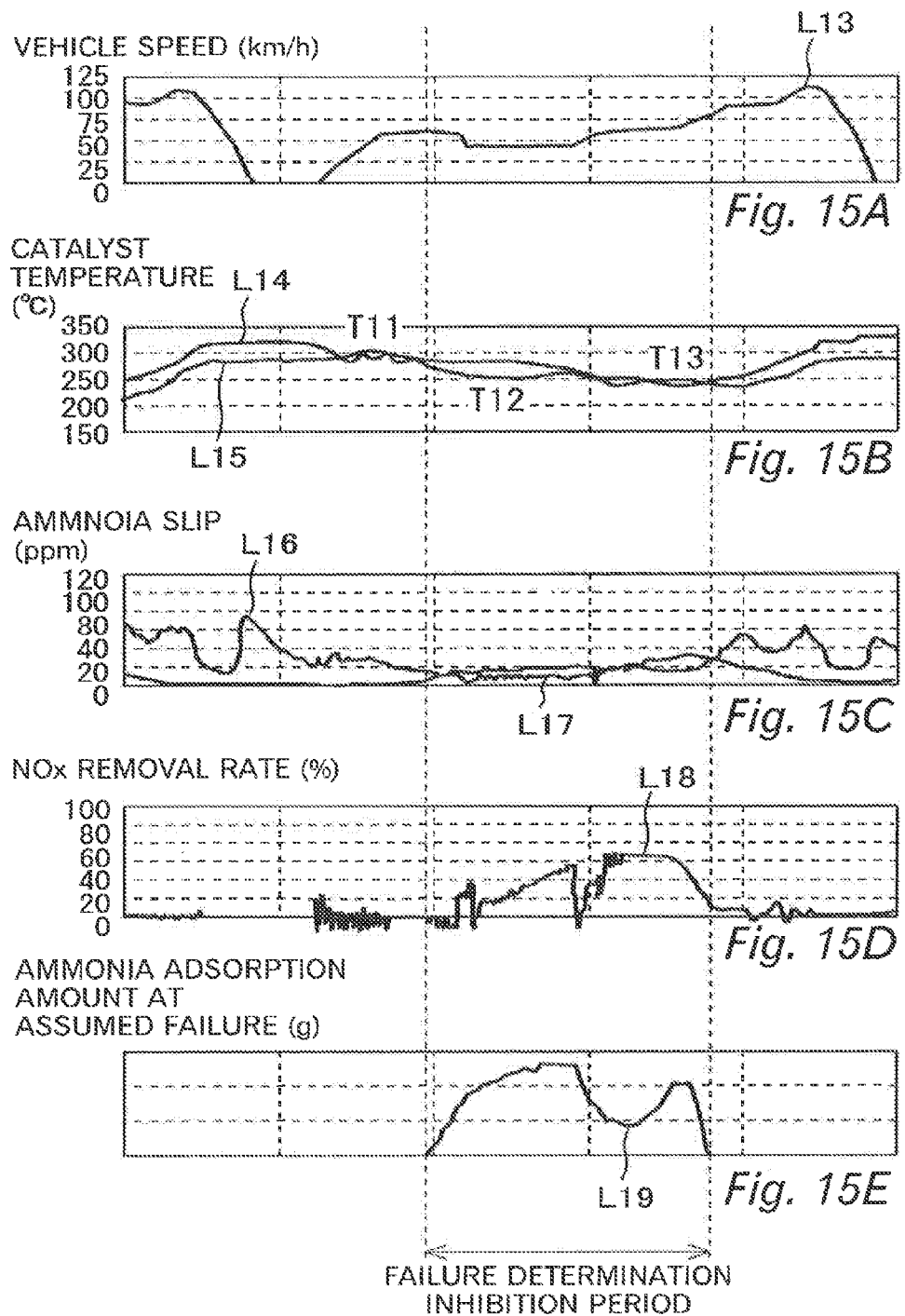

FAILURE DETERMINATION SYSTEM OF EXHAUST GAS PURIFICATION APPARATUS

CROSS-REFERENCE TO RELATED APPLICATIONS

This application is a national phase application of International Application No. PCT/JP2013/082847, filed Dec. 6, 2013, and claims the priority of Japanese Application Nos. 2012-267325, filed Dec. 6, 2012, and 2012-267326, filed Dec. 6, 2012, the content of all of which is incorporated herein by reference.

TECHNICAL FIELD

The present invention relates to a failure determination system of exhaust gas purification apparatus.

BACKGROUND ART

There has been known an exhaust gas purification apparatus having a NOx selective catalytic reduction catalyst (hereinafter, referred to simply as a "NOx catalyst") which removes NOx contained in exhaust gas discharged from an internal combustion engine by using ammonia as a reducing agent. In the exhaust gas purification apparatus, there is provided a supply valve or the like which serves to supply ammonia or a precursor of ammonia into the exhaust gas at a location upstream from the NOx catalyst, so that an ammonia adsorption amount in the NOx catalyst can be in a state adequate for removal of NOx.

Here, in a technology disclosed in a first patent literature, in cases where an actual NOx removal rate calculated based on detected values from NOx sensors, which are disposed upstream and at downstream side of a NOx catalyst, respectively, does not reach a target NOx removal rate correlated with the temperature of the NOx catalyst, adjustment is made to increase the addition amount of urea water as a precursor of ammonia. At this occasion, if the NOx removal rate after the increasing adjustment is not increased from the NOx removal rate before the increasing adjustment, it is judged that an ammonia slip is occurring in the NOx catalyst, and then, under other predefined conditions, it will be judged that an exhaust gas purification apparatus is in failure.

CITATION LIST

Patent Literature

Patent Literature 1: Japanese patent laid-open publication No. 2003-293743
Patent Literature 2: Japanese patent laid-open publication No. 2008-190529
Patent Literature 3: Japanese patent laid-open publication No. 2010-95221
Patent Literature 4: Japanese patent laid-open publication No. 2011-220142

SUMMARY OF INVENTION

Technical Problem

In an exhaust gas purification apparatus for an internal combustion engine in which a NOx catalyst (NOx selective catalytic reduction catalyst) is used, NOx in exhaust gas is removed by ammonia as a reducing agent being supplied thereto. Here, the present applicant has found out that even in cases where components of the exhaust gas purification apparatus is in no state to exhibit a desired function, i.e., has reached a failure state, a failure determination of the exhaust gas purification apparatus may not be performed adequately, due to the adsorption characteristic of ammonia in the NOx catalyst.

For example, in the exhaust gas purification apparatus, in order to supply ammonia as the reducing agent to the NOx catalyst, an ammonia supply source is disposed upstream from the NOx catalyst. However, in cases where the supply of ammonia from the ammonia supply source is not performed adequately, i.e., in cases where an adequate amount of ammonia with respect to an amount of NOx in the exhaust gas flowing into the NOx catalyst is not supplied, the reduction of NOx by the NOx catalyst will not be performed to a sufficient extent, and hence it will be judged that the exhaust gas purification apparatus is in a failure state. In general, a NOx sensor is disposed downstream from the NOx catalyst, and by figuring out the NOx removal rate in the NOx catalyst or the like based on the detected value of the NOx sensor, the presence or absence of failure of the exhaust gas purification apparatus is determined. Thus, the present applicant has found out that in cases where a failure determination of the exhaust gas purification apparatus is performed based on the detected value of the NOx sensor, the exhaust gas purification apparatus may be erroneously detected to be normal due to the adsorption characteristic of ammonia in the NOx catalyst, despite of the fact that malfunction of the exhaust gas purification apparatus, particularly a component that supplies ammonia to the NOx catalyst for reduction of NOx, should essentially be detected. That is, under a condition where the component to supply ammonia is in failure, if failure determination of the exhaust gas purification apparatus is performed based on the detected value of the NOx sensor at a time of transient temperature increase of the NOx catalyst, there is a possibility of an erroneous determination that the exhaust gas purification apparatus is not in failure (i.e., normal) being made.

In addition, in order to obtain the removal rate of NOx by means of the NOx catalyst, in general, a NOx sensor is disposed downstream from the NOx catalyst. Here, the present applicant has also found out that in cases where a mounted NOx sensor is of the type that is vulnerable to interference of ammonia, that is, in cases where a NOx sensor is such that it can detect ammonia in the exhaust gas as NOx in addition to the NOx in the exhaust gas, there is a possibility that the NOx catalyst may be erroneously detected to be normal due to a fluctuation in the amount of ammonia in the exhaust gas flowing out of the NOx catalyst, despite of the fact that malfunction of the NOx catalyst should essentially be detected. That is, under a condition where the NOx catalyst has deteriorated to some extent, if the NOx sensor is of the type that is vulnerable to the interference of ammonia is used and when the amount of ammonia in the exhaust gas flowing out of the NOx catalyst decreases temporarily at a time of temperature drop of the NOx catalyst, there is a possibility of an erroneous determination that the NOx catalyst mounted in the exhaust gas purification apparatus is not deteriorated (i.e., normal) being made due to the influence of such decrease in the amount of ammonia despite of the fact that the NOx catalyst is deteriorated.

If such erroneous normal-determinations are made, a warning or the like that should essentially be signaled in order to prompt the user to repair the failed exhaust gas purification apparatus will not be made, and hence, the exhaust gas purification apparatus will continue to be used in the failure state, which is not preferable from a perspective of the purification of exhaust gas.

The present invention has been made in view of the problems as mentioned above, and the object of the invention is to appropriately avoid an occurrence of erroneous determinations with respect to failure determination of an exhaust gas purification apparatus, in a failure determination system of exhaust gas purification apparatus having a NOx catalyst.

Solution to Problem

In the present invention, in order to solve the aforementioned problems, the present applicant has taken into consideration an equilibrium state with respect to ammonia adsorption in a NOx catalyst, assuming that an exhaust gas purification apparatus for an internal combustion engine is in a predefined failure state. This is because even when a particular component of the exhaust gas purification apparatus is in a failure state, in cases where an equilibrium state of ammonia adsorption in which the failure state has been reflected is formed, and where a situation with respect to the exhaust gas purification apparatus is transient such as when the temperature of exhaust gas fluctuates, a difference between the equilibrium state of ammonia adsorption in which the failure state has been reflected and an actual state of ammonia adsorption is made, and the difference can affect the failure determination of the exhaust gas purification apparatus.

Accordingly, the present invention resides in a failure determination system of exhaust gas purification apparatus which includes: a NOx selective catalytic reduction catalyst that is disposed in an exhaust passage of an internal combustion engine and uses ammonia as a reducing agent; a reducing agent supply unit that supplies ammonia or a precursor of ammonia into exhaust gas flowing into the NOx selective catalytic reduction catalyst at a location upstream from the NOx selective catalytic reduction catalyst; and a NOx sensor that is disposed downstream from the NOx selective catalytic reduction catalyst and detects NOx in exhaust gas flowing out of the NOx selective catalytic reduction catalyst. In addition, this system further includes: a failure determination unit that performs failure determination of the exhaust gas purification apparatus based on a detected value of the NOx sensor; a calculation unit that calculates an adsorption amount difference at assumed failure, the adsorption amount difference at assumed failure being a difference between an ammonia equilibrium adsorption amount in the NOx selective catalytic reduction catalyst in an equilibrium state of ammonia adsorption, assuming that the exhaust gas purification apparatus is in a predefined failure state, and an actual ammonia adsorption amount in the NOx selective catalytic reduction catalyst; and a failure determination restriction unit that restricts an use of the detected value of the NOx sensor in the failure determination by the failure determination unit or inhibits the failure determination itself by the failure determination unit, when the adsorption amount difference at assumed failure calculated by the calculation unit exceeds a predetermined value. According to such a configuration, in cases where an erroneous determination may be drawn due to an ammonia adsorption state in the NOx catalyst, an occurrence of the erroneous determination can be avoided by imposing a certain restriction on the failure determination of the exhaust gas purification apparatus.

More specifically, the system according to the present invention can be seen from the aspect of a system which performs failure determination of the reducing agent supply unit included in the exhaust gas purification apparatus. That is, in the above-mentioned failure determination system of exhaust gas purification apparatus, the failure determination unit may perform failure determination of the reducing agent supply unit of the exhaust gas purification apparatus based on the detected value of the NOx sensor; and the calculation unit may calculate the adsorption amount difference at assumed failure that is of under assumption that the reducing agent supply unit of the exhaust gas purification apparatus is in the predefined failure state, and is of in a condition where the actual ammonia adsorption amount in the NOx selective catalytic reduction catalyst becomes greater than the ammonia equilibrium adsorption amount.

In the above-mentioned exhaust gas purification apparatus, the NOx catalyst is included, and the NOx catalyst adsorbs ammonia in the exhaust gas and selectively reduces NOx by using adsorbed ammonia as the reducing agent. Here, note that the ammonia consumed in this NOx catalyst is ammonia or the precursor thereof (e.g., urea, etc.) which is supplied to the exhaust gas by means of the reducing agent supply unit. The ammonia or the like to be supplied may be supplied to the exhaust gas in the state of an aqueous solution, and may be supplied to the exhaust gas in the state of gas. Thus, in the failure determination system of the exhaust gas purification apparatus which reduces and removes the NOx in the exhaust gas by making use of ammonia as the reducing agent, the failure determination of the exhaust gas purification apparatus is performed by means of the failure determination unit, based on the detected value of the NOx sensor disposed downstream from the NOx catalyst. That is, by letting the failure determination unit use the detected value of the NOx sensor as the amount of NOx in the exhaust gas flowing out of the NOx catalyst, the failure determination based on the removal rate of NOx, for example, becomes possible. In general, when the NOx removal rate in the NOx catalyst becomes less than a criterion value, it can be determined that the exhaust gas purification apparatus is in failure.

Here, in the NOx catalyst, an amount of ammonia adsorbing to the catalyst carrier and an amount of ammonia desorbing from the catalyst carrier may change successively according to an environment in which the NOx catalyst is placed (a catalyst temperature, etc.). However, when the environment in which the NOx catalyst is placed is stable, a state in which the amount of ammonia adsorbing to the catalyst carrier and the amount of ammonia desorbing from the catalyst carrier are in balance with each other, i.e., an equilibrium state, will be reached. In the present application, an ammonia adsorption amount in the NOx catalyst in which an equilibrium state with respect to the adsorption of ammonia has been reached is referred to as an ammonia equilibrium adsorption amount. With respect to this ammonia equilibrium adsorption amount, there is exhibited a characteristic (hereinafter, also referred to as an "adsorption characteristic") in which in cases where the exhaust gas purification apparatus is normal, i.e., in cases where the NOx catalyst and the reducing agent supply unit are normal, the ammonia equilibrium adsorption amount decreases as the catalyst temperature becomes higher.

As one form of the failure state of the exhaust gas purification apparatus, one case can be exemplified where the reducing agent supply unit fails so that it falls into a state where it cannot supply an amount of reducing agent that should essentially be supplied. In such a case, a sufficient amount of ammonia as the reducing agent to the NOx catalyst cannot be supplied, and hence the NOx removal rate of the NOx catalyst will drop. Then, in cases where the reducing agent supply unit has failed in this manner, the above-mentioned adsorption characteristic peculiar to the failure of the reducing agent supply unit can be confirmed, though the NOx removal rate of the NOx catalyst is low, i.e., the amount of ammonia that can be adsorbed to the catalyst carrier in the NOx catalyst becomes less.

In consideration of the above, the present applicant has found out that at the time when failure determination with respect to the NOx catalyst is performed by the failure determination unit by making use of the detected value of the NOx sensor, there is a possibility that the exhaust gas purification apparatus is judged to be normal (not in failure), though the reducing agent supply unit is in failure. As mentioned above, even in the state where the reducing agent supply unit has failed, ammonia, though being small in amount, may be adsorbed to the NOx catalyst, so that the adsorption thereof may reach an equilibrium state. However, in cases where the operation of the internal combustion engine is in a transient state, the equilibrium state with respect to the ammonia adsorption in the NOx catalyst may break. For example, according to the above-mentioned adsorption characteristic in the NOx catalyst, when the temperature of the NOx catalyst goes up rapidly, the desorption of ammonia in the NOx catalyst cannot meet the rapid rise in temperature, thus resulting in a state where the actual ammonia adsorption amount becomes more than the ammonia equilibrium adsorption amount corresponding to the temperature of the NOx catalyst. In this case, when the NOx catalyst itself is in a state where it has not deteriorated, the actual NOx catalyst will be placed in an environment where a relatively large amount of ammonia can be used, so that the NOx removal rate in the NOx catalyst will go up, though temporarily. Then, as a result, even in cases where the reducing agent supply unit is in a failure state, and the exhaust gas purification apparatus is in a state where it should be determined to be in failure, due to this temporary improvement in the NOx removal rate, there is a possibility that a determination that the exhaust gas purification apparatus is normal (not in failure) may erroneously be made.

Accordingly, in the failure determination system of exhaust gas purification apparatus according to the present invention, the calculation unit calculates the adsorption amount difference at assumed failure that is the difference between an ammonia equilibrium adsorption amount assuming that the reducing agent supply unit is in a failure state, and an actual ammonia adsorption amount in the NOx catalyst. The adsorption amount difference at assumed failure is considered to be a factor to derive the above-mentioned temporary improvement in the NOx removal rate. Then, in cases where the calculated adsorption amount difference at assumed failure exceeds a predetermined value, a certain restriction is imposed on the failure determination of the failure determination unit by the failure determination restriction unit, as there is a possibility that the above-mentioned erroneous determination may occur.

Here, since the failure determination unit performs failure determination of the exhaust gas purification apparatus by directly detecting the amount of NOx in the exhaust gas with the use of the detected value of the NOx sensor, it can be considered that the above-mentioned erroneous determination may occur due to the occurrence of the adsorption amount difference at assumed failure. Accordingly, with respect to the restriction by the failure determination restriction unit, a restriction should be imposed at least on the use of the NOx sensor for directly detecting the amount of NOx, which is one cause of the erroneous determination. For that reason, as an example, the use of the detected value of the NOx sensor may be restricted in the failure determination by the failure determination unit. In this case, the failure determination of the exhaust gas purification apparatus may be made in consideration of the NOx removal rate which is calculated by detection, estimation or the like of the amount of NOx in the exhaust gas flowing out of the NOx catalyst by alternative means other than the NOx sensor. In addition, in cases where the detection of NOx by the alternative means is not performed or the like, the failure determination restriction unit may inhibit the failure determination itself by the failure determination unit. With this, in the failure determination system of exhaust gas purification apparatus according to the present invention, it becomes possible to avoid the above-mentioned erroneous determination due to the adsorption amount difference at assumed failure.

It is considered that the above-mentioned erroneous determination due to the adsorption amount difference at assumed failure tends to occur when in a state where a determination of being in a failure state switches to a determination of being normal due to a temporary rise in the NOx removal rate of the NOx catalyst. Accordingly, in the above-mentioned failure determination system of exhaust gas purification apparatus, the failure determination unit may perform failure determination based on a NOx removal rate of the NOx selective catalytic reduction catalyst calculated from the detected value of the NOx sensor and an amount of NOx in the exhaust gas flowing into the NOx selective catalytic reduction catalyst; and the predefined failure state may be a failure state being set corresponding to a threshold value of the NOx removal rate used when it is determined by the failure determination unit that the reducing agent supply unit is in failure. As described, by setting the predefined failure state based on a NOx removal rate that is of the threshold value for the failure determination based on the NOx removal rate, the probability of the occurrence of the above-mentioned erroneous determination due to the adsorption amount difference at assumed failure can be estimated accurately, so that in cases where there is a possibility of the occurrence of an erroneous determination, it becomes possible to avoid the erroneous determination more reliably, by imposing the above-mentioned restriction by the failure determination restriction unit.

Here, in the failure determination system of exhaust gas purification apparatus described as above, the calculation unit may calculate the adsorption amount difference at assumed failure based at least on an absorption amount difference between an actual ammonia adsorption amount in the NOx selective catalytic reduction catalyst corresponding to a transient time catalyst temperature, the transient time catalyst temperature being a temperature of the NOx selective catalytic reduction catalyst in a temperature rising process, and the equilibrium adsorption amount in the NOx selective catalytic reduction catalyst corresponding to the transient time catalyst temperature. As mentioned above, the absorption characteristic of the NOx catalyst tends to depend on the temperature of the NOx catalyst. Accordingly, by using the transient time catalyst temperature of the NOx catalyst as an index, the difference between the actual ammonia adsorption amount in the NOx catalyst and the equilibrium adsorption amount can be rationally calculated as the adsorption amount difference at assumed failure, i.e., a factor which temporarily pushes up the NOx removal rate of the NOx catalyst.

In addition, it is also possible to further use other parameters in the calculation of the adsorption amount difference at assumed failure. That is, in the above-mentioned failure determination system of exhaust gas purification apparatus, the calculation unit may further calculate the adsorption amount difference at assumed failure, based on at least one of: a surplus ammonia adsorption amount that is an amount of ammonia overly adsorbed to the NOx selective catalytic reduction catalyst attributed to a surplus reducing agent of the reducing agent supplied from the reducing agent supply unit; a consumed ammonia increased amount that is an increased amount of an ammonia consumption amount for NOx reduction in the NOx selective catalytic reduction catalyst being at the transient time catalyst temperature from an ammonia consumption amount for NOx reduction in the NOx selective catalytic reduction catalyst being in an equilibrium state with respect to ammonia adsorption; and an ammonia desorption amount that is an amount of ammonia desorbed from the NOx selective catalytic reduction catalyst.

The surplus amount of ammonia adsorbed to the NOx catalyst is an amount of ammonia which becomes surplus to the adsorbed ammonia which is in an equilibrium state with respect to the adsorption of ammonia in the case where the reducing agent supply unit is in a failure state. For example, there may be a case where an amount of ammonia that is more than a necessary amount for the reduction of NOx is supplied for the purpose of cooling the reducing agent supply unit. Even in such a case, an amount of ammonia more than an amount in an equilibrium state can be adsorbed to the NOx catalyst. The surplus amount of ammonia adsorbed to the NOx catalyst acts in a direction to increase the adsorption amount difference at assumed failure, and hence, in consideration of this point, the adsorption amount difference at assumed failure may be calculated, as mentioned above.

Moreover, the greater the amount of ammonia adsorbed to the NOx catalyst, the easier it becomes to reduce NOx. That is, even if the reducing agent supply unit has been in a failure state, when the NOx catalyst itself is normal, its NOx reduction ability can be maintained. For that reason, in cases where the amount of ammonia adsorbed to the NOx catalyst is more than the ammonia adsorption amount in an equilibrium state, the consumption amount of ammonia will increase from that in the equilibrium state. Then, an amount of ammonia consumed more than that in the equilibrium state acts in a direction to decrease the adsorption amount difference at assumed failure, and hence, in consideration of this point, the adsorption amount difference at assumed failure may be calculated, as mentioned above.

Then, the ammonia desorption amount from the NOx catalyst changes according to the amount of ammonia adsorbed to the NOx catalyst. That is, the greater the amount of ammonia adsorbed to the NOx catalyst, the easier it becomes for ammonia to desorb, and hence the ammonia desorption amount becomes greater. In addition, the greater the ammonia desorption amount from the NOx catalyst, the smaller the amount of ammonia adsorbed to the NOx catalyst becomes, and hence the adsorption amount difference at assumed failure becomes smaller. As described, the amount of ammonia adsorbed to the NOx catalyst and the amount of ammonia to be desorbed from the NOx catalyst influence with each other, and the ammonia desorption amount from the NOx catalyst acts in a direction to decrease the adsorption amount difference at assumed failure, and hence, in consideration of this point, the adsorption amount difference at assumed failure may be calculated, as mentioned above.

As described, by calculating the adsorption amount difference at assumed failure in consideration of the parameters related to the adsorption amount difference at assumed failure, it is possible to improve the accuracy of the calculation thereof. As a result, the restriction on the failure determination by the failure determination restriction unit can be suppressed as much as possible to minimum, thus making it possible to assure an appropriate execution of the failure determination.

Moreover, the system according to the present invention can be seen from the aspect of a system which performs failure determination of the NOx selective catalytic reduction catalyst included in the exhaust gas purification apparatus. That is, in the above-mentioned failure determination system of exhaust gas purification apparatus, in cases where the NOx sensor is a sensor that also detects ammonia in the exhaust gas as NOx; the failure determination unit may perform failure determination with respect to deterioration of the NOx selective catalytic reduction catalyst of the exhaust gas purification apparatus based on the detected value of the NOx sensor; and the calculation unit may calculate the adsorption amount difference at assumed failure that is of under assumption that the NOx selective catalytic reduction catalyst of the exhaust gas purification apparatus is in the predefined failure state and is of in a condition where the actual ammonia adsorption amount in the NOx selective catalytic reduction catalyst becomes smaller than the ammonia equilibrium adsorption amount in a process in which the temperature of the NOx selective catalytic reduction catalyst is dropping.

In the failure determination system of exhaust gas purification apparatus according to the present invention, failure determination with respect to the deterioration of the NOx catalyst disposed in the exhaust passage of the internal combustion engine is performed. Note that in this description, a state where the NOx selective catalytic reduction catalyst cannot exhibit a desired NOx reduction ability is expressed by either "deterioration" or "failure".

The NOx sensor for detecting the NOx in the exhaust gas flowing out of the NOx catalyst is disposed downstream from the NOx catalyst. This NOx sensor is of the so-called a type that can be affected by the interference of ammonia, and hence has a characteristic that when ammonia is contained in exhaust gas, the ammonia is also detected as NOx. Accordingly, the detected value of the NOx sensor is dependent on the NOx and the ammonia which are contained in the exhaust gas. Then, in the failure determination system of exhaust gas purification apparatus according to the present invention, failure determination of the NOx catalyst will be performed by the failure determination unit by making use of the detected value of this NOx sensor. That is, by at least using the detected value of the NOx sensor as the amount of NOx in the exhaust gas flowing out of the NOx catalyst, the failure determination of the NOx catalyst based on the removal rate of NOx, for example, becomes possible. In general, when the NOx removal rate in the NOx catalyst becomes less than a criterion value, it can be determined that the NOx catalyst is deteriorated.

Here, in the NOx catalyst, an amount of ammonia adsorbing to the catalyst carrier and an amount of ammonia desorbing from the catalyst carrier may change successively according to an environment in which the NOx catalyst is placed (a catalyst temperature, etc.). However, when the environment in which the NOx catalyst is placed is stable, a state in which the amount of ammonia adsorbing to the catalyst carrier and the amount of ammonia desorbing from the catalyst carrier are in balance with each other, i.e., an equilibrium state, will be reached. In the present application, an ammonia adsorption amount in the NOx catalyst in which an equilibrium state with respect to the adsorption of ammonia has been reached is referred to as an ammonia equilibrium adsorption amount. With respect to this ammonia equilibrium adsorption amount, there is exhibited a characteristic (hereinafter, also referred to as an "adsorption characteristic") in which in cases where the NOx catalyst is normal, i.e., in cases where the NOx catalyst is not determined to be in failure by the failure determination unit, the ammonia equilibrium adsorption amount decreases as the catalyst temperature becomes higher. In addition, even in cases where the NOx catalyst is in failure, i.e., even in cases where it should be determined by the failure determination unit that the NOx catalyst is in failure, the above-mentioned adsorption characteristic can be confirmed, although the NOx removal rate of the NOx catalyst is low due to the failure state of the NOx catalyst, i.e., although the amount of ammonia that can be adsorbed to the catalyst carrier in the NOx catalyst becomes small.

In view of the above, the present applicant has found out that at the time when failure determination with respect to the NOx catalyst is performed by the failure determination unit by making use of the detected value of the NOx sensor, there is a possibility that the NOx catalyst that should be judged to be in failure is erroneously judged to be normal (not in failure). As mentioned above, even in a failure state where the NOx catalyst has not completely failed, ammonia, though being small in amount, may be adsorbed to the NOx catalyst, so that the adsorption thereof may reach an equilibrium state. However, in cases where the temperature of the NOx catalyst is in the process of dropping, the equilibrium state with respect to the ammonia adsorption in the NOx catalyst may break, if the temperature change is relatively rapid. According to the above-mentioned absorption characteristic in the NOx catalyst, when the temperature of the NOx catalyst drops, the adsorption of ammonia in the NOx catalyst cannot be quick enough, thus resulting in a state where the actual ammonia adsorption amount is less than the ammonia equilibrium adsorption amount corresponding to the temperature of the NOx catalyst. For that reason, in such a state, there will be a room created in the actual NOx catalyst in which ammonia can be adsorbed.

As described, when the room for adsorbing ammonia is created in the actual NOx catalyst resulting from a drop in temperature of the NOx catalyst, the amount of ammonia in the exhaust gas flowing out of the NOx catalyst (i.e., the amount of ammonia slip) will become smaller as a result. The NOx sensor disposed downstream from the NOx catalyst is vulnerable to the interference of ammonia, and hence when the amount of ammonia slip becomes smaller as mentioned above, the NOx removal rate of the NOx catalyst calculated based on the detected value of the NOx sensor will be improved apparently. For that reason, even in cases where the NOx catalyst is in a state where it should be determined to be in failure, with this apparent improvement in the NOx removal rate, there is a possibility that a determination that the NOx catalyst is normal (not in failure) may erroneously be made.

Accordingly, in the failure determination system of exhaust gas purification apparatus according to the present invention, the calculation unit calculates the adsorption amount difference at assumed failure that is the difference between an ammonia equilibrium adsorption amount assuming that the NOx catalyst is in a failure state, and an actual ammonia adsorption amount in the NOx catalyst, during the process of temperature drop of the NOx catalyst in which the possibility of the above-mentioned erroneous determination arises. This adsorption amount difference at assumed failure corresponds to the room that can adsorb the ammonia. Then, in cases where the calculated adsorption amount difference at assumed failure exceeds a predetermined value, a certain restriction is imposed on the failure determination of the failure determination unit by the failure determination restriction unit, as there is a possibility that the above-mentioned erroneous determination may occur.

Because the NOx sensor is vulnerable to the interference of ammonia, it is considered that the above-mentioned erroneous determination may occur due to the occurrence of the adsorption amount difference at assumed failure. Accordingly, with respect to the restriction by the failure determination restriction unit, a restriction should be imposed at least on the use of the NOx sensor, which is one cause of the erroneous determination. For that reason, as an example, the use of the detected value of the NOx sensor may be restricted in the failure determination by the failure determination unit. In this case, the failure determination of the NOx catalyst may be made in consideration of the NOx removal rate which is calculated by detection, estimation or the like of the amount of NOx in the exhaust gas flowing out of the NOx catalyst by alternative means other than the NOx sensor. In addition, in cases where the detection of NOx by the alternative means is not performed or the like, the failure determination restriction unit may inhibit the failure determination itself by the failure determination unit. With this, in the failure determination system of exhaust gas purification apparatus according to the present invention, it becomes possible to avoid the above-mentioned erroneous determination due to the adsorption amount difference at assumed failure.

It is considered that the above-mentioned erroneous determination due to the adsorption amount difference at assumed failure tends to occur when the NOx catalyst is in a failure state where a determination of the NOx catalyst being in a failure state based on the temporary decrease of the ammonia slip amount switches to a determination of the NOx catalyst being normal. Accordingly, in the above-mentioned failure determination system of exhaust gas purification apparatus, the failure determination unit may perform failure determination based on a NOx removal rate of the NOx selective catalytic reduction catalyst calculated from the detected value of the NOx sensor and an amount of NOx in the exhaust gas flowing into the NOx selective catalytic reduction catalyst; and the predefined failure state may be a failure state being set corresponding to a threshold value of the NOx removal rate used when it is determined by the failure determination unit that the NOx selective catalytic reduction catalyst is deteriorated. As described, by setting the predefined state based on a NOx removal rate that is of the threshold value for the failure determination based on the NOx removal rate, the probability of the occurrence of the above-mentioned erroneous determination due to the adsorption amount difference at assumed failure can be estimated accurately, so that in cases where there is a possibility of the occurrence of an erroneous determination, it becomes possible to avoid the erroneous determination more reliably, by imposing the above-mentioned restriction by the failure determination restriction unit.

Here, in the failure determination system of exhaust gas purification apparatus described above, the calculation unit may calculate the adsorption amount difference at assumed failure based at least on an absorption amount difference between an ammonia adsorption amount in the NOx selective catalytic reduction catalyst corresponding to a transient time catalyst temperature, the transient time catalyst temperature being a temperature of the NOx selective catalytic reduction catalyst in a temperature dropping process, and the equilibrium adsorption amount in the NOx selective catalytic reduction catalyst corresponding to the transient time catalyst temperature. As mentioned above, the absorption characteristic of the NOx catalyst tends to depend on the temperature of the NOx catalyst. Accordingly, by using the transient time catalyst temperature of the NOx catalyst as an index, the difference between the actual ammonia adsorption amount in the NOx catalyst and the equilibrium adsorption amount can be rationally calculated as the adsorption amount difference at assumed failure, i.e., the room in which ammonia can be desorbed to the NOx catalyst.

In addition, it is also possible to further use other parameters in the calculation of the adsorption amount at assumed failure. That is, in the failure determination system of exhaust gas purification apparatus, the calculation unit may calculate the adsorption amount difference at assumed failure, based further on at least either one of: a surplus ammonia adsorption amount that is an amount of ammonia overly adsorbed to the NOx selective catalytic reduction catalyst attributed to a surplus reducing agent of the reducing agent supplied from the reducing agent supply unit, the surplus reducing agent being surplus corresponding to the predefined failure state; and a consumed ammonia decreased amount that is a decreased amount of an ammonia consumption amount for NOx reduction in the NOx selective catalytic reduction catalyst being at the transient time catalyst temperature from an ammonia consumption amount for NOx reduction in the NOx selective catalytic reduction catalyst being in an equilibrium state with respect to ammonia adsorption.

Supposing that the NOx catalyst is in the predefined failure state, of the ammonia or the like that has been supplied by the reducing agent supply unit, the ammonia or the like that has not been used for the reduction of NOx in the NOx catalyst will be overly adsorbed to the NOx catalyst as a surplus reducing agent. Then, this surplus reducing agent is something that decreases an absorption amount difference between the actual ammonia adsorption amount in the NOx catalyst corresponding to the transient time catalyst temperature, and the equilibrium adsorption amount in the NOx catalyst corresponding to the transient time catalyst temperature, and hence, in consideration of this point, the adsorption amount difference at assumed failure may be calculated, as mentioned above.

Moreover, as the adsorption state of ammonia in the NOx catalyst departs from the equilibrium state due to the temperature drop of the NOx catalyst, the amount of ammonia consumed for the reduction of NOx in the NOx catalyst decreases. This amount of decrease in ammonia consumption is the consumed ammonia decreased amount, and this is something that decreases the absorption amount difference between the actual ammonia adsorption amount in the NOx catalyst corresponding to the transient time catalyst temperature, and the equilibrium adsorption amount in the NOx catalyst corresponding to the transient time catalyst temperature, and hence, in consideration of this point, the adsorption amount difference at assumed failure may be calculated, as mentioned above.

Furthermore, the consumed ammonia decreased amount may be set to zero. In cases where the NOx catalyst is in the predefined failure state, it is assumed that the NOx reduction ability of the NOx catalyst is extremely low. In such a case, even if the adsorption amount at assumed failure is calculated by setting the consumed ammonia decreased amount to zero, thereby substantially ignoring the consumed ammonia decreased amount, the accuracy of the calculation would not be degraded.

Advantageous Effects of Invention

According to the present invention, it is possible to appropriately avoid the occurrence of erroneous determinations with respect to failure determination of an exhaust gas purification apparatus, in a failure determination system of exhaust gas purification apparatus having a NOx catalyst.

BRIEF DESCRIPTION OF DRAWINGS

FIG. 9 is a view for explaining the concept of failure determination with respect to a NOx selective catalytic reduction catalyst in a second example of the present invention.

FIGS. 15A to 15E are views illustrating the transitions of: the speed of a vehicle with the internal combustion engine mounted thereon, the catalyst temperature, the amount of ammonia slip, the NOx removal rate, and the adsorption amount difference at assumed failure, in the case where the execution control of the failure determination shown in FIG. 14 is performed.

DESCRIPTION OF EMBODIMENTS

Hereinafter, specific embodiments of the present invention will be described based on the attached drawings. However, the dimensions, materials, shapes, relative arrangements and so on of component parts described in the examples are not intended to limit the technical scope of the present invention to these alone in particular as long as there are no specific statements.

First Example

Figure 1:
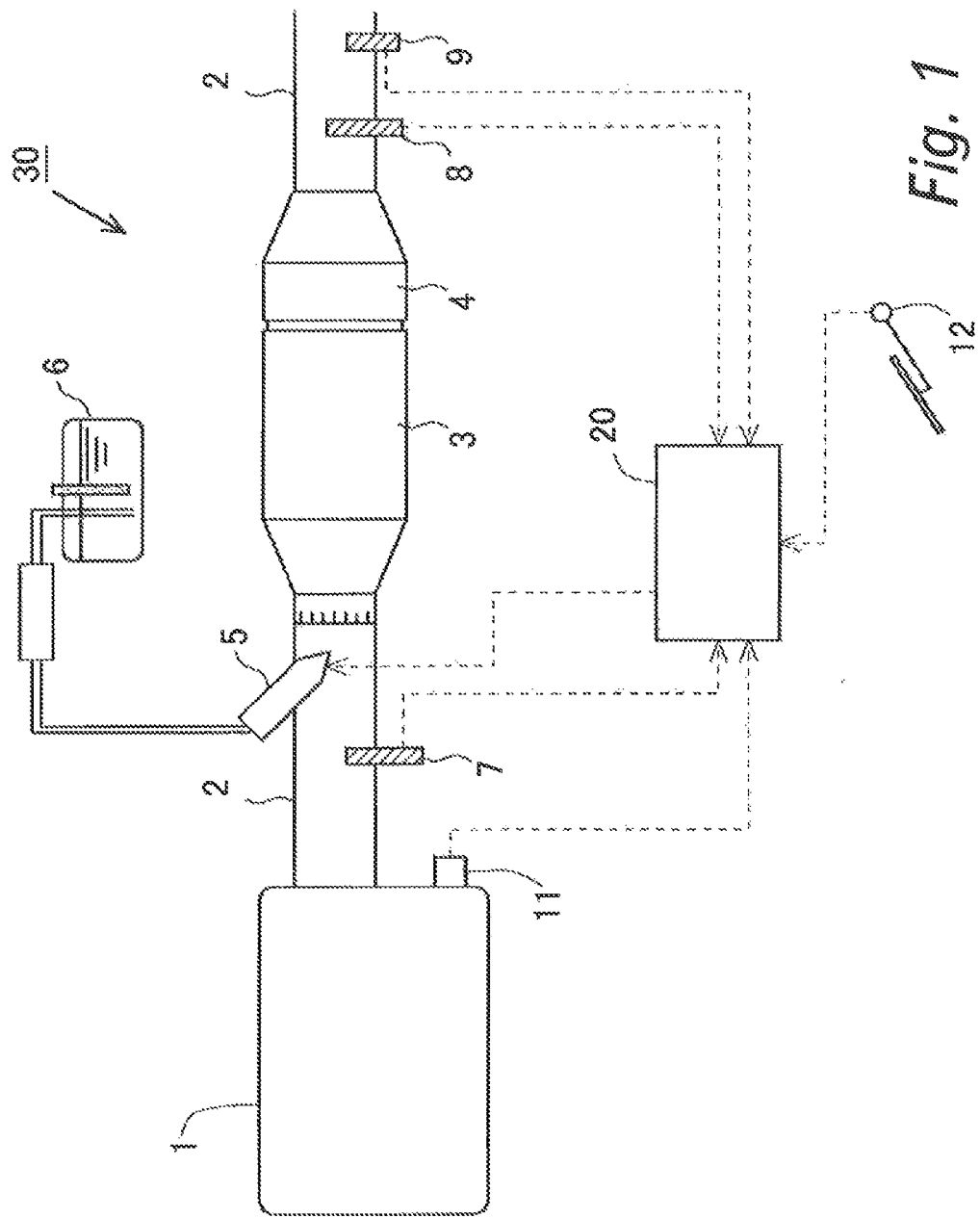
FIG. 1 is a view illustrating a schematic construction of an intake system and an exhaust system of an internal combustion engine according to an example of the present invention.

Reference will be made to an example of a failure determination system of exhaust gas purification apparatus disposed in an exhaust passage of an internal combustion engine according to the present invention, based on the drawings attached to this description. FIG. 1 is a view illustrating the schematic construction of an exhaust gas purification apparatus 30 disposed in an exhaust system of an internal combustion engine according to this example. Here, note that the internal combustion engine 1 is a diesel engine for driving a vehicle. An exhaust passage 2 is connected to the internal combustion engine 1, but in FIG. 1, the description of an intake system of the internal combustion engine 1 is omitted.

In the exhaust passage 2, there is disposed a NOx selective catalytic reduction catalyst (hereinafter, referred to simply as an "NOx catalyst") 3 which serves to selectively reduce NOx in exhaust gas by using ammonia as a reducing agent. Further, downstream from the NOx catalyst 3, there is disposed an oxidation catalyst (hereinafter, referred to as an "ASC catalyst") 4 for oxidizing ammonia which has slipped from the NOx catalyst 3. In addition, in order to generate ammonia which acts as a reducing agent in the NOx catalyst 3, urea water stored in a urea tank 6 is added into the exhaust gas by means of a supply valve 5. Here, note that although illustration is omitted, a particulate filter for trapping particulate matter (PM) in the exhaust gas is disposed upstream from the NOx catalyst 3, and in addition, an oxidation catalyst for oxidizing predetermined components (unburnt fuel, CO, etc.) in the exhaust gas is also disposed upstream from the particulate filter. The exhaust gas purification apparatus 30 of the internal combustion engine 1 is composed of the catalyst, the filter and a supply system (the supply valve 5, the urea tank 6, etc.) for supplying the reducing agent to the NOx catalyst.

Moreover, upstream from the NOx catalyst 3, there is disposed a NOx sensor 7 for detecting the NOx in the exhaust gas flowing into the NOx catalyst 3, and downstream from the NOx catalyst 3, there are disposed a NOx sensor 8 for detecting the concentration of NOx in the exhaust gas flowing out of the NOx catalyst 3 and a temperature sensor 9 for detecting the temperature of the exhaust gas. In addition, an electronic control unit (ECU) 20 is provided in combination with the internal combustion engine 1, and this ECU 20 is a unit that controls the operating state of the internal combustion engine 1 the exhaust gas purification apparatus, and so on. An air flow meter (illustration being omitted), a crank position sensor 11 and an accelerator opening sensor 12, in addition to the NOx sensor 7, the NOx sensor 8 and the temperature sensor 9 as mentioned above, are electrically connected to the ECU 20, and the detected values of these individual sensors are passed or transmitted to the ECU 20.

Accordingly, the ECU 20 can grasp the operating state of the internal combustion engine 1, such as the number of engine revolutions per unit time based on the detection of the crank position sensor 11, the engine load based on the detection of the accelerator opening sensor 12, etc. Here, note that in this example, the NOx in the exhaust gas flowing into the NOx catalyst 3 is able to be detected by the NOx sensor 7, but the NOx contained in the exhaust gas discharged from the internal combustion engine 1 (the exhaust gas before being purified or reduced in the NOx catalyst 3, i.e., the exhaust gas flowing into the NOx catalyst 3) has relation with the operating state of the internal combustion engine, and hence, is also able to be estimated based on the above-mentioned operating state of the internal combustion engine 1. In addition, the ECU 10 is able to estimate the temperature of the NOx catalyst 3 and the temperature of the ASC catalyst 4 based on the temperature of the exhaust gas detected by the temperature sensor 9 or by a temperature sensor (not shown) which is disposed upstream from the NOx catalyst 3. Then, according to the amount of NOx (the concentration of NOx) in the exhaust gas, which is detected or estimated in this manner, the ECU 20 gives an instruction to the supply valve 5, so that an amount of urea water necessary for the reduction and removal of NOx is supplied into the exhaust gas. Here, note that in cases where the NOx catalyst 3 is not in an activated state, the reduction of NOx using the supplied urea water cannot be performed in an effective manner, and hence, the supply of the urea water from the supply valve 5 is performed in cases where the NOx catalyst 3 to be estimated is equal to or higher than a predetermined temperature at which the NOx catalyst is in the activated state.

Here, failure determination for the exhaust gas purification apparatus 30 according to this example will be explained. The failure determination of the exhaust gas purification apparatus 30 is performed based on the degree of NOx reduction by the NOx catalyst 3 which constitutes the exhaust gas purification apparatus 30. Specifically, when the NOx removal rate of the NOx catalyst 3 becomes less than a predetermined threshold value (a failure determination threshold value), a judgment is made that the exhaust gas purification apparatus 30 is in a failure state, because the exhaust gas purification apparatus 30 cannot exhibit sufficient NOx reduction performance. Here, the NOx removal rate of the NOx catalyst 3 can be denoted by the following expression.

$$\text{NOx removal rate} = 1 - (\text{detected value of NOx sensor 8})/(\text{detected value of NOx sensor 7}) \quad \text{(Expression 1)}$$

Then, the supply valve 5, one of the elements which constitute the exhaust gas purification apparatus 30, may also fall into a failure state. For example, when the amount of supply of the urea water decided according to the amount of the NOx in the exhaust gas flowing into the NOx catalyst 3 is set as 100%, it can be the that in cases where the urea water only in the amount of 50% or less can be supplied due to a certain cause of deficiency in the supply valve 5, the supply valve 5 is in a failure state. Thus, when the supply valve 5 falls into the failure state, the urea water only in an amount less than that necessary for the reduction of NOx can be supplied to the NOx catalyst 3, so that the NOx removal rate of the NOx catalyst 3 becomes a low value, and in some cases, is less than the failure determination threshold value, as mentioned above, as a result of which the failure state of the exhaust gas purification apparatus 30 will be detected.

Here, the present applicant has found out that in the system which performs the failure determination of the exhaust gas purification apparatus 30 by making use of the NOx removal rate of the NOx catalyst 3, as shown above, the NOx removal rate goes up temporarily in the case of a specific transient state in which the operating state of the internal combustion engine 1 varies, though the supply valve 5 is in a failure state, there is a fear that it is erroneously judged that the exhaust gas purification apparatus 30 is normal (i.e., erroneous normality determination), despite of the fact that because of the failure of the supply valve 5, it should originally be determined that the exhaust gas purification apparatus 30 is in failure. Accordingly, the specific transient state in which the above-mentioned erroneous normality determination can be caused will be explained based on FIG. 2 through FIG. 6.

Figure 2:
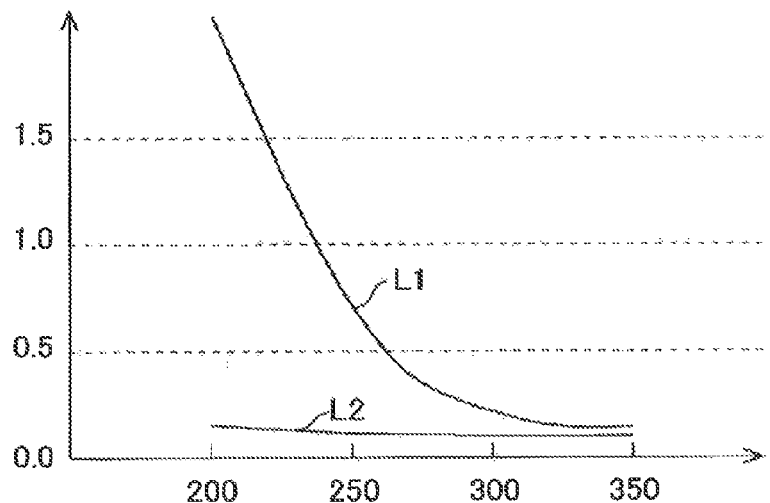
FIG. 2 is a view illustrating the correlation between the ammonia adsorption amount and the catalyst temperature in a NOx selective catalytic reduction catalyst in a first example of the present invention.

In FIG. 2, there is shown a correlation between the catalyst temperature in the NOx catalyst 3 and the ammonia adsorption amount in the case of an equilibrium state with respect to the adsorption of ammonia. The equilibrium state referred to herein is the to be a state in which with respect to the ammonia adsorption in the NOx catalyst 3, the amount of ammonia to adsorb to the carrier of the NOx catalyst 3 and the amount of ammonia to adsorb from the carrier of the NOx catalyst 3 are in balance with each other, so that the amount of ammonia adsorbed to the carrier becomes apparently constant. This equilibrium state tends to depend on the temperature of the NOx catalyst 3 to a large extent.

In cases where abnormality is not seen in the exhaust gas purification apparatus 30, i.e., in cases where the NOx catalyst 3 is not in a deteriorated state and at the same time the supply valve 5 is not in a failure state, either, the amount of ammonia to be adsorbed to the NOx catalyst 3 tends to decrease in accordance with the rise of the temperature of the NOx catalyst, as shown by line L1. In general, the rate of decrease in the ammonia equilibrium adsorption amount (the rate at which the equilibrium adsorption amount decreases with respect to the rise in the catalyst temperature) in the case where the temperature of the NOx catalyst is relatively low becomes larger in comparison with the rate of decrease in the case where the temperature of the NOx catalyst is relatively high.

On the other hand, in cases where the NOx catalyst 3 itself is not in a deteriorated state but the supply valve 5 is in a failure state in which an amount of urea water required for the reduction of NOx in the exhaust gas cannot be supplied to the NOx catalyst 3 (hereinafter, also referred to a "supply valve failure state"), the range of variation in the ammonia adsorption amount with respect to the temperature change of the NOx catalyst 3 becomes extremely small, as shown by line L2, when expressed at the same scale as in the case where the NOx catalyst 3 is in a normal state (i.e., a state shown by the line L1). Here, note that the supply valve failure state corresponding to the line L2 means a state in which only an amount of 50% of that required for the reduction of NOx in the exhaust gas can be supplied to the NOx catalyst 3. Accordingly, in the supply valve failure state, a sufficient amount of urea water cannot be supplied, so that the NOx removal rate of the NOx catalyst 3 will be less than the failure determination threshold value, and the failure state of the exhaust gas purification apparatus 30 including the supply valve 5 will be detected.

Then, the equilibrium state with respect to the ammonia adsorption in the NOx catalyst 3 in such a supply valve failure state is an equilibrium state with respect to the ammonia adsorption in the NOx catalyst 3, which is set corresponding to a threshold value for the failure determination of the above-mentioned exhaust gas purification apparatus 30. That is, a state, in which the balance between ammonia adsorption and ammonia desorption in the NOx catalyst 3 in an ammonia atmosphere generated from the supplied urea water is maintained when the capacity to supply urea water from the supply valve 5 is 50% of that originally required, becomes the equilibrium state shown by the line L2 in FIG. 2.

Figure 3:
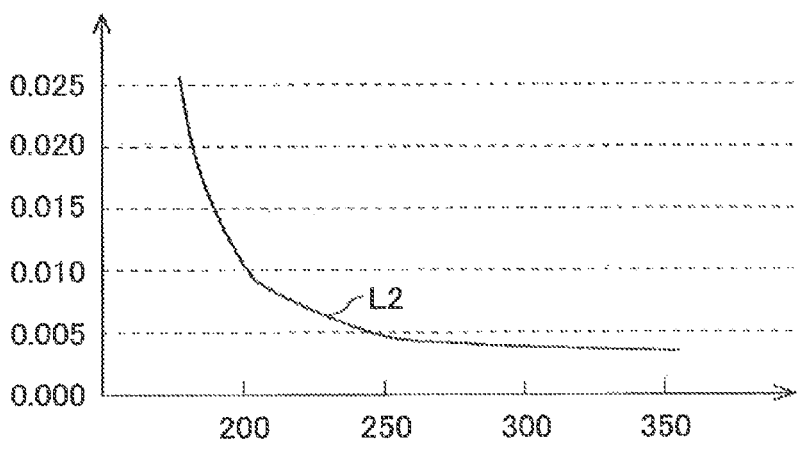
FIG. 3 is a view illustrating the correlation between the ammonia adsorption amount and the catalyst temperature in the NOx selective catalytic reduction catalyst in a case where a supply valve is in a failure state, in a first example of the present invention.

However, even in the exhaust gas purification apparatus 30 which is in the supply valve failure state as mentioned above, when the scale of the display is enlarged, as shown in FIG. 3, there can be found out a tendency that the ammonia adsorption amount decreases gradually as the catalyst temperature goes up, though the absolute value of the ammonia adsorption amount is small. Then, in cases where the catalyst temperature goes up in the supply valve failure state in which a characteristic with respect to the ammonia adsorption amount as shown in FIG. 3 occurs, and in cases where the temperature rise is rapid, there may arise a situation in which the equilibrium state in the NOx catalyst 3 with respect to the adsorption of ammonia can be broken, as a result of which the specific transient state can be brought about in which the above-mentioned erroneous normality determination can be caused. This will be explained below with reference to FIG. 4 and FIG. 5.

Here, based on FIG. 4, a consideration will be given to the ammonia adsorption amount in the case where the catalyst temperature goes up from 200 degrees C. to 300 degrees C. in the NOx catalyst 3 which is in the equilibrium state with respect to the adsorption of ammonia in the exhaust gas purification apparatus 30 under the supply valve failure state. Note that when the catalyst temperature is at 200 degrees C., it is assumed that the NOx catalyst 3 is in the equilibrium state (i.e., the state shown by point P1 (the catalyst temperature being at 200 degrees C., and the ammonia adsorption amount being X1)). In such a case, as the catalyst temperature changes from 200 degrees C. to 300 degrees C. in a gradual manner, the adsorption state of the NOx catalyst 3 defined by the catalyst temperature and the ammonia adsorption amount reaches an equilibrium state in the case where the catalyst temperature is 300 degrees C. (i.e., a state shown by point P2 (the catalyst temperature being at 300 degrees C., and the ammonia adsorption amount being X2)) through a locus corresponding to the equilibrium state specified by the line L2. In this case, the NOx catalyst 3 will always be placed in the equilibrium state in the rising process of the catalyst temperature.

However, in cases where the catalyst temperature goes up rapidly from 200 degrees C. to 300 degrees C., the desorption of ammonia in the NOx catalyst 3 does not keep up with the temperature rise, so that the adsorption state of the NOx catalyst 3 reaches a state departing to a large extent from the equilibrium state specified by the line L2, i.e., a state shown by point P3 (the catalyst temperature being at 300 degrees C., and the ammonia adsorption amount being X1). The state shown by this point P3 can be the to be one in which ammonia has been adsorbed to an excessive extent, as seen from the viewpoint of the equilibrium state, but on the other hand, in the supply valve failure state, the NOx catalyst 3 is not in a deteriorated state though the supply valve 5 is in a failure state. For that reason, even if ammonia has been adsorbed to an excessive extent, like the adsorption state shown by the point P3, the NOx catalyst 3 can use the ammonia thus adsorbed to an excessive extent for the reduction of NOx by means of the NOx reduction ability thereof, and as a result, the NOx removal rate of the NOx catalyst 3 can be enhanced. Accordingly, the adsorption state shown by the point P3 can be the to be one in which there is a room left for the NOx catalyst 3 to perform NOx reduction (hereinafter, also referred to as an "NOx reduction room state"). The temperature rise to cause such a NOx reduction room state to occur corresponds to a temperature rise in a temperature rising process in the present invention, and the temperature (e.g., 200 degrees C.) of the NOx catalyst 3 in the temperature rising process corresponds to a transient time catalyst temperature.

In the exhaust gas purification apparatus 30 being in the supply valve failure state, when the NOx reduction room state has occurred as mentioned above, the NOx removal rate of the NOx catalyst 3 will go up temporarily with the ammonia adsorbed to an excessive extent as seen from the equilibrium state (i.e., an amount of ammonia corresponding to (X1-X2)), thus giving rise to a possibility that a judgment may be erroneously made that the exhaust gas purification apparatus 30, which should be judged to be in a failure state due to the failure of the supply valve 5, is normal (the above-mentioned erroneous normality determination). In such a case, it is preferable to refrain from the calculation of the NOx removal rate making use of the detected values of the NOx sensors 7, 8 (the calculation based on expression 1).

Figure 5:
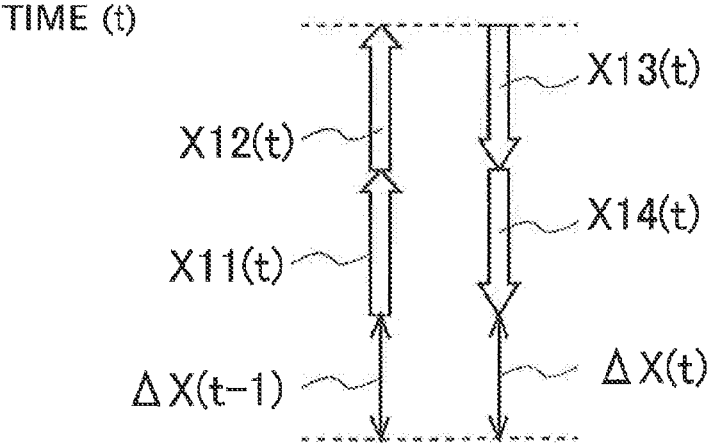
FIG. 5 is a view schematically illustrating the ammonia adsorption amount in the NOx selective catalytic reduction catalyst when the catalyst temperature has risen rapidly so that the adsorption state of ammonia in the NOx selective catalytic reduction catalyst has reached a state shown by point P3 from point P1 shown in FIG. 4, in the first example of the present invention.

Here, the above-mentioned NOx reduction room state of the NOx catalyst 3 will be considered and investigated in detail. FIG. 5 is a view schematically illustrating an excessive ammonia adsorption amount in the NOx catalyst 3 in which the catalyst temperature goes up rapidly and the adsorption state has reached the state shown by the point P3. Here, note that an ammonia adsorption amount ΔX shown in FIG. 5 corresponds to the excessive ammonia adsorption amount ΔX which represents the NOx reduction room state of the NOx catalyst 3. Then taking account of the fact that the ammonia adsorption amount ΔX changes with time, when the ammonia adsorption amount ΔX is calculated, parameters X11, X12, X13, X14 to be explained below are each represented by a function of time, and at the same time, repeated operations are performed according to the passage of time.

Figure 4:
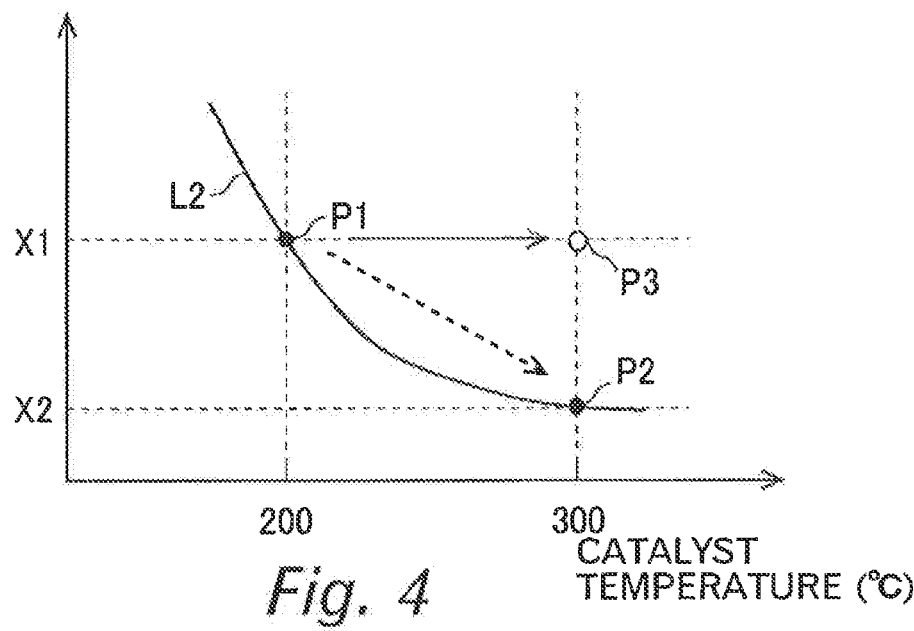
FIG. 4 is a view illustrating the change in the adsorption state of ammonia when the catalyst temperature of the NOx selective catalytic reduction catalyst has risen in the case where the supply valve is in the failure state, in the first example of the present invention.

A displacement of the ammonia adsorption amount shown by arrow $X11(t)$ in FIG. 5 means an ammonia adsorption amount which is an excessive ammonia adsorption amount resulting from that the temperature of the NOx catalyst 3 has gone up rapidly, as shown in FIG. 4, too, and which can be used for NOx reduction by the reduction ability of the NOx catalyst 3. For example, in the case when the catalyst temperature goes up from 200 degrees C. to 300 degrees C. at time point t, the displacement $X11(t)$ means an ammonia adsorption amount of (X2-X1). Accordingly, in FIG. 5, a displacement indicated by an upward arrow is due to a factor by which the NOx removal rate can be improved, in comparison with the case where the NOx catalyst 3 is in the equilibrium state, and on the contrary, a displacement indicated by a downward arrow is due to a factor by which the NOx removal rate can be dropped, in comparison with the case where the NOx catalyst 3 is in the equilibrium state. Here, note that data has been obtained in advance through experiments or the like for the correlation between the catalyst temperature and the ammonia equilibrium adsorption amount in the exhaust gas purification apparatus 30 which is in the supply valve failure state (i.e., the relation of them shown by the line L2), and the data thus obtained has been stored in a memory in the ECU 20 as a control map. Then, the ammonia equilibrium adsorption amount corresponding to the catalyst temperature can be calculated by accessing the control map.

Then, with respect to the NOx reduction room state of the NOx catalyst 3 in the exhaust gas purification apparatus 30 which is in the supply valve failure state, it is also preferable to take into consideration the following three factors as shown below, in addition to the arrow X11. By taking these factors into consideration, the degree of the NOx reduction room state (the amount of room) of the NOx catalyst 3 can be grasped in a more accurate manner.

(1) Amount of Adsorption of Ammonia Resulting from a Change in the Supply of Urea Water by the Supply Valve 5

Here, the amount of urea water supplied from the supply valve 5 may be made to increase or decrease for purposes other than the reduction of NOx by the NOx catalyst 3. For example, in the case of an operating state in which the temperature of the supply valve 5 is considered to become too high, an amount of urea water more than that necessary for the reduction of NOx is supplied from the supply valve 5 in order to decrease the temperature of the supply valve 5. That is, the temperature decrease or drop of the supply valve 5 is attained by circulating a larger amount of urea water to the supply valve 5. In such a case, the amount of ammonia flowing into the NOx catalyst 3 increases.

Then, the ammonia thus increased can be used for the reduction of NOx by the NOx catalyst 3 which is not in a deterioration state under the supply valve failure state, and so, it acts in a direction to enlarge the NOx reduction room state of the NOx catalyst 3. Accordingly, the ammonia adsorption amount ΔN1 resulting from the change (increase or decrease) in the supply of urea water by the supply valve 5 is represented by arrow $X12(t)$ in FIG. 5, and the magnitude thereof can be represented by the following expression.

$$\Delta N1 = \text{(amount of generation of ammonia generated by the supplied urea water instructed from the ECU 20−reference amount of generation of ammonia)} \times \text{gain} \quad \text{(Expression 2)}$$

Here, with respect to the amount of generation of ammonia generated by the supplied urea water instructed from the ECU 20" data has been obtained in advance through experiments or the like for the relation between the amount of urea water supplied according to an instruction from the ECU 20 and the temperature of the exhaust gas, and the data thus obtained has been stored in the memory in the ECU 20 as a control map. Then, by accessing the control map at any time, the amount of ammonia supplied to the NOx catalyst 3 can be calculated based on the amount of urea water supplied by the supply valve 5 and the temperature of the exhaust gas. For the above-mentioned instruction from the ECU 20, the above-mentioned predetermined purposes (cooling of the supply valve 5, etc.) are taken into consideration. In addition, "the reference amount of generation of ammonia" is an amount of ammonia which is required for reducing NOx based on an amount of NOx flowing into the NOx catalyst 3, and may be obtained in advance through experiments or the like. Moreover, the "gain" is a parameter which has been set by supposing, as a premise, that the exhaust gas purification apparatus 30 is in the supply valve failure state, and which represents the ratio or proportion of an amount of ammonia which will actually be supplied to the NOx catalyst 3 through the supply valve 5, when assuming that an amount of supply of ammonia in the case of following a command or instruction from the ECU 20 is set as 100%. In this example, the failure state of the supply valve 5 is defined as a state where the amount of supply of ammonia has become 50% or less with respect to an amount (i.e., an amount necessary for NOx reduction) commanded or instructed from the ECU 20, and hence, the value of the gain is set to 50%.

Here, note that there can also be considered a case where the amount of supply of urea water is made to decrease for some reason. In this case, an amount of the decrease may act in a direction to diminish the NOx reduction room state of the NOx catalyst 3, and so, in FIG. 5, the arrow X12 is pointed in a downward direction.

(2) Increased Amount of Ammonia Consumption Due to a Non-Equilibrium State

As mentioned above, the adsorption state in the NOx catalyst 3 shown by the point P3 can be the to be a state deviated from the equilibrium state, i.e., a non-equilibrium state. When the adsorption state of the NOx catalyst 3 reaches the non-equilibrium state due to a rise in the temperature of the NOx catalyst 3, the amount of ammonia having been adsorbed to the NOx catalyst 3 becomes large, as a result of which it is considered that the consumption amount of ammonia increases due to the promoted reaction of NOx and ammonia, in comparison with the case where the NOx catalyst 3 is in the equilibrium state at the same catalyst temperature. This increased consumption amount of ammonia acts in the direction to diminish the NOx reduction room state of the NOx catalyst 3. Then, this increased consumption amount of ammonia $\Delta N2$ is represented by arrow $X13(t)$ in FIG. 5.

With respect to the increased consumption amount of ammonia $\Delta N2$, a control map has been built through prior experiments or the like by using, as parameters, the ammonia adsorption amount, the temperature of the NOx catalyst 3, and the flow rate of the exhaust gas (instead, the amount of intake air may also be used), and by associating these parameters and the increased amount of the NOx removal rate with one another, and the map thus built has been stored in the memory in the ECU 20. Then, by accessing the control map at an arbitrary time, the increased consumption amount of ammonia $\Delta N2$ can be calculated from the above-mentioned increased amount of the NOx removal rate and the amount of NOx in the exhaust gas flowing into the NOx catalyst 3, in the case where the NOx catalyst 3 is in a non-equilibrium state at the arbitrary time.

(3) Amount of Desorption of Ammonia Desorbed from the NOx Catalyst 3

In a state where ammonia has been adsorbed in the NOx catalyst 3 to an excessive extent as seen from the equilibrium state (i.e., the adsorption state indicated by P3), the ammonia can desorb from the NOx catalyst 3. However, the whole of the ammonia adsorbed to an excessive extent does not desorb all at once, but an excessive adsorption amount thereof decreases gradually. Then, this ammonia desorption amount $\Delta N3$ acts in a direction to diminish the NOx reduction room state of the NOx catalyst 3, and is represented by arrow $X14(t)$ in FIG. 4.

Then, the desorption amount $\Delta N3$ of ammonia can be calculated by using, as parameters, the excessive ammonia adsorption amount and the temperature of the NOx catalyst 3, for example, according to the following expression.

$$\Delta N3 = k \times \text{excessive ammonia adsorption amount} \times \exp(-Ea/\text{temperature of NOx catalyst}) \quad \text{(Expression 3)}$$

where k and Ea are constants which can be obtained in advance through experiments, simulations, or the like.

Figure 6:
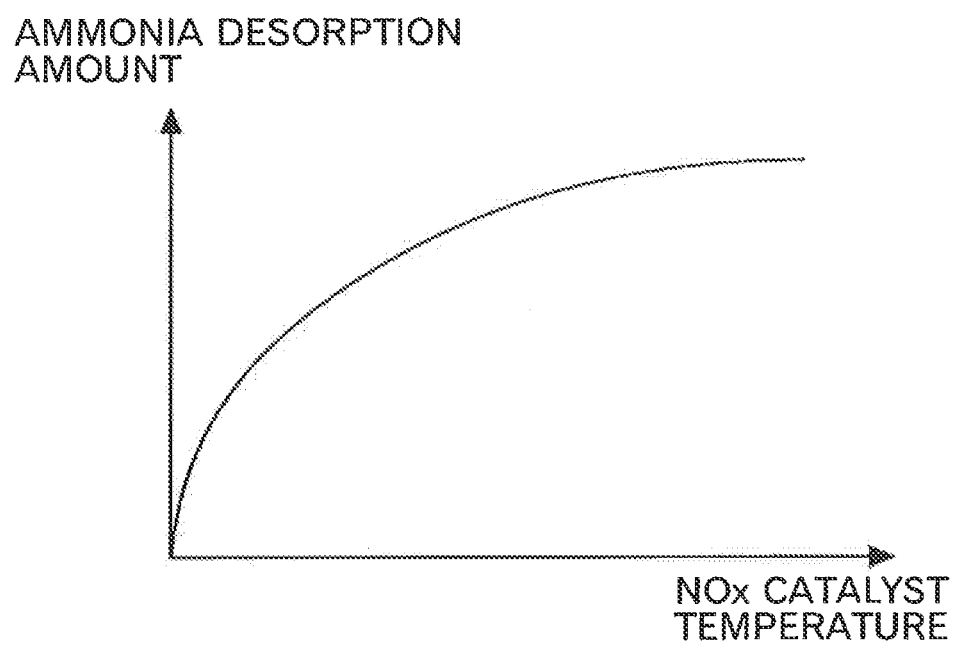
FIG. 6 is a view illustrating the relation between the catalyst temperature of the NOx selective catalytic reduction catalyst and the ammonia desorption amount therefrom in the first example of the present invention.

Here, FIG. 6 is a view illustrating the relation between the temperature of the NOx catalyst 3, and the ammonia desorption amount $\Delta N3$. Thus, the ammonia desorption amount $\Delta N3$ depends on the temperature of the NOx catalyst 3, so that the higher the temperature of the NOx catalyst 3, the larger becomes the ammonia desorption amount $\Delta N3$, but on the other hand, the higher the temperature of the NOx catalyst 3, the smaller becomes the degree of the increase of the ammonia desorption amount $\Delta N3$ with respect to the degree of the rise of the temperature of the NOx catalyst 3.

Then, an excessive ammonia adsorption amount $\Delta X(t)$ indicating the NOx reduction room state of the NOx catalyst 3 can be grasped in an accurate manner by taking into consideration the above-mentioned factors (1) through (3) with respect to the excessive ammonia adsorption amount (X1-X2) resulting from the temperature rise. In the example shown in FIG. 5, as shown in the following expression 4, the ammonia adsorption amount $\Delta X(t)$, which is obtained by subtracting the magnitudes of the arrow $X13(t)$ and the arrow $X14(t)$ from the magnitude of an ammonia adsorption amount $\Delta X(t-1)$ in a previous cycle added by the arrow $X11(t)$ and the arrow $X12(t)$, corresponds to the excessive ammonia adsorption amount $\Delta X(t)$ indicating the NOx reduction room state of the NOx catalyst 3.

$$\Delta X(t) = \Delta X(t-1) + X11(t) + X12(t) - X13(t) - X14(t) \quad \text{(Expression 4)}$$

Here, note that in the very first cycle (time point t=0) in which the excessive ammonia adsorption amount $\Delta X(t)$ indicating the NOx reduction room state is calculated, the ammonia adsorption amount $\Delta X(t-1)$ is set to zero ($\Delta X(t-1)=0$) as a boundary value.

As described, the degree of the NOx reduction room state (the amount of room) of the NOx catalyst 3 can be grasped in an accurate manner, by taking into consideration the above-mentioned factors, i.e., (1) the ammonia adsorption amount resulting from the change in the amount of urea water supplied by the supply valve 5, (2) the increased amount of ammonia consumption due to the non-equilibrium state, and (3) the ammonia desorption amount from the NOx catalyst 3, with respect to the excessive ammonia adsorption amount resulting from the temperature rise. In the example shown in FIG. 5, the amount of room of NOx reduction indicated by $\Delta X$ is an amount of room of NOx reduction when assuming that the supply valve 5 is in a predefined failure state (i.e., a state in which only an amount of 50% of that required can be supplied), i.e., a displacement (difference) of the ammonia adsorption amount with respect to the equilibrium state, and hence, $\Delta X$ is referred to as an "adsorption amount difference at assumed failure". Then, it is suggested or mentioned that in cases where the adsorption amount difference at assumed failure has occurred to some extent in the NOx catalyst 3, when failure determination based on the NOx removal rate using the detected value of the NOx sensor 8 is performed, there is a possibility that normality determination is erroneously made, though it should be determined that the exhaust gas purification apparatus 30 is in failure, because of the supply valve 5 being in the predefined failure state.

Figure 7:
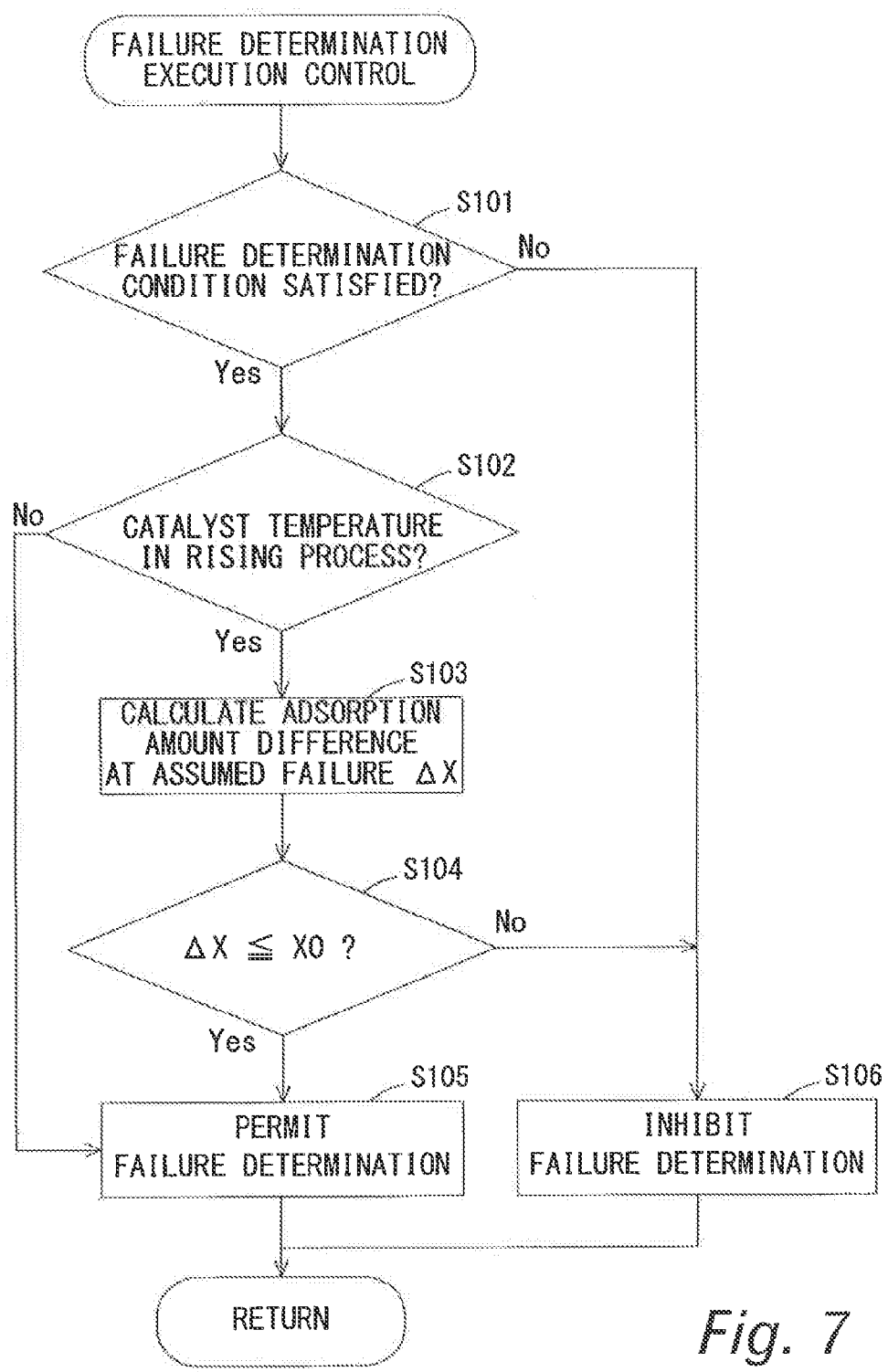
FIG. 7 is a flow chart with respect to the execution control of failure determination of an exhaust gas purification apparatus performed in a failure determination system of the exhaust gas purification apparatus according to the first example of the present invention.
Figure 8A:
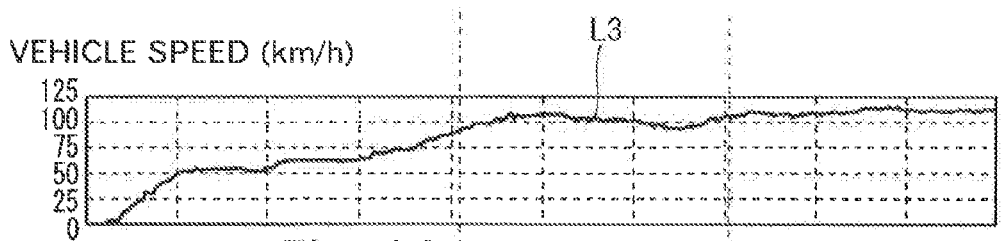
FIGS. 8A to 8D are views illustrating the transitions of: the speed of a vehicle with the internal combustion engine mounted thereon, the catalyst temperature, the NOx removal rate, and the adsorption amount difference at assumed failure, in the case where the control shown in FIG. 7 is performed.
Figure 8B:
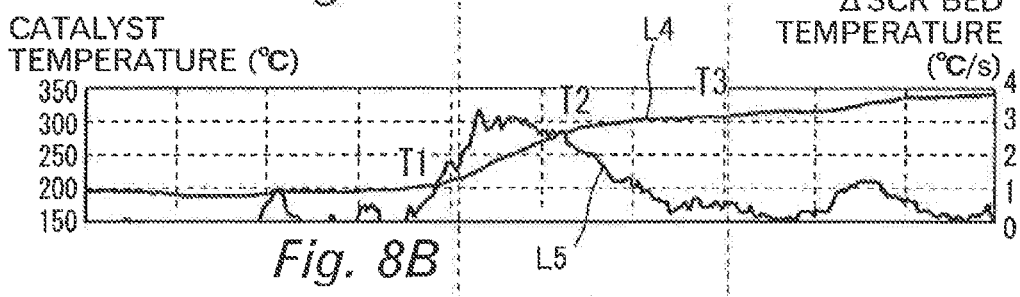
Figure 8C:
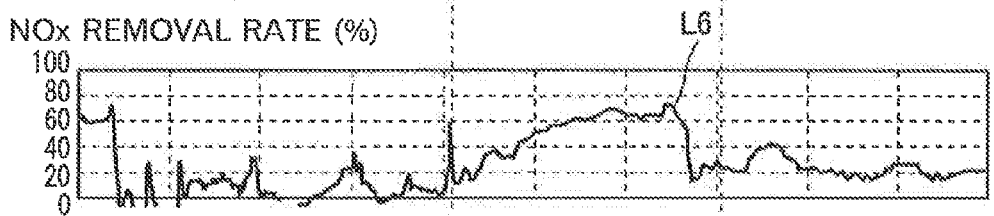
Figure 8D:
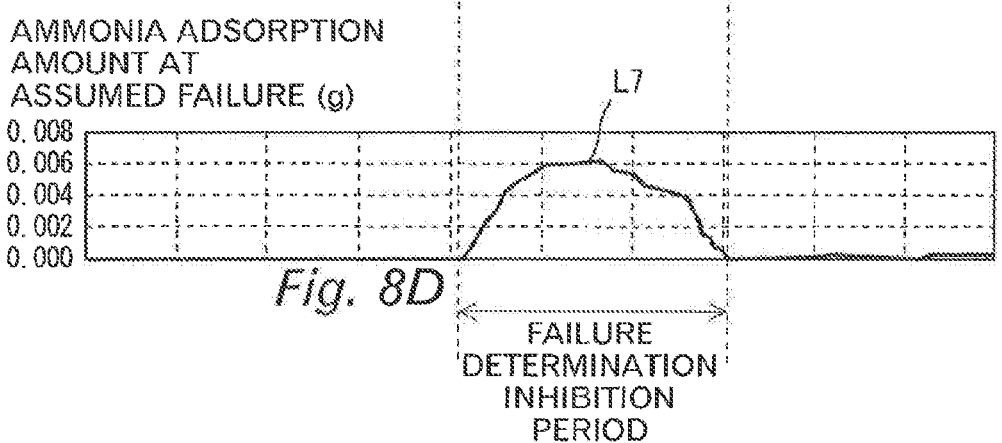

Accordingly, in cases where there is such a possibility, it is preferable to apply a certain restriction to the above-mentioned failure determination based on the NOx removal rate, so that erroneous normality determination is not performed. Based on the above, in this example, failure determination execution control is performed with respect to the failure determination of the exhaust gas purification apparatus 30, as shown in FIG. 7. That control is performed by execution of a control program stored in the ECU 20.

First, in step S101, it is determined whether a condition for performing the failure determination of the exhaust gas purification apparatus 30 based on the NOx removal rate calculated according to the expression 1 is satisfied. As one example of such a condition, there is mentioned whether the temperature of the NOx catalyst 3 has exceeded a catalyst temperature for the catalyst 3 to be in an activated state, or whether the temperatures of the NOx sensors 7, 8 has gone up to a temperature at which they can perform NOx detection, or the like. The temperature of the NOx catalyst 3 can be estimated based on the detected value of the temperature sensor 9, etc., and the temperatures of the NOx sensors 7, 8 can be estimated based on an elapsed period of time after the internal combustion engine 1 has started to warm up, etc. When an affirmative determination is made in step S101, the control program or routine goes to step S102, whereas when a negative determination is made, the routine goes to step S106.

Then, it is determined whether the temperature of the NOx catalyst 3 is in a relatively rapid temperature rising process in which it changes from the point P1 to the point P3 as shown in FIG. 4, i.e., it deviates from an equilibrium state with respect to the adsorption of ammonia in the NOx catalyst 3. For example, in cases where the rate of rise (the speed of rise) of the temperature of the NOx catalyst 3 becomes equal to or higher than a predetermined value, an affirmative determination is made that the temperature of the NOx catalyst 3 is in the relatively rapid rising process, and the routine goes to step S103. On the other hand, when a negative determination is made in step S102, the temperature rise of the NOx catalyst 3 is relatively gradual, so it means that it is possible to maintain a substantially equilibrium state. Accordingly, in that case, the processing or routine goes to step S105.

Subsequently, in step S103, the adsorption amount difference at assumed failure ΔX shown in FIG. 5 is calculated with respect to the NOx catalyst 3 which is in the temperature rising process. In this example, as stated above, the adsorption amount difference at assumed failure ΔX is calculated by taking into consideration the ammonia adsorption amount resulting from the supply of urea water by the supply valve 5, the increased amount of ammonia consumption due to the non-equilibrium state, and the ammonia desorption amount from the NOx catalyst 3, with respect to the excessive ammonia adsorption amount resulting from the temperature rise. Here, note that in order to make simple the calculation of the adsorption amount difference at assumed failure ΔX, a value of the excessive adsorption amount with respect to the adsorption of ammonia resulting from the temperature rise (i.e., a displacement of the ammonia adsorption amount corresponding to the arrow X11 shown in FIG. 5) may also be used as the adsorption amount difference at assumed failure ΔX.

In step 3104, it is determined whether the difference adsorption amount at assumed failure ΔX calculated in step S103 is equal to or less than a predetermined threshold value X0. The predetermined threshold value X0 is set, based on the above-mentioned erroneous normality determination resulting from a temporary rise in the NOx removal rate, which will occur when the adsorption amount difference at assumed failure ΔX becomes large, by taking into consideration the correlation between the magnitude of the adsorption amount difference at assumed failure ΔX and the possibility of the occurrence of erroneous normality determination. Accordingly, when an affirmative determination is made in step S104, the value of the adsorption amount difference at assumed failure ΔX is adequately low, and so the possibility of the erroneous normality determination is also low, as a result of which the execution of the failure determination of the exhaust gas purification apparatus 30 based on the NOx removal rate is accordingly permitted (processing in step S105). On the other hand, when a negative determination is made in step S104, the value of the adsorption amount difference at assumed failure ΔX is relatively high, and so the possibility of the erroneous normality determination is also high, as a result of which the execution of the failure determination of the exhaust gas purification apparatus 30 based on the NOx removal rate is accordingly inhibited (processing in step S106). When the processing in step S105 or the processing in step 3106 is performed, the processing in step S101 is repeated again.

Here, in FIG. 8, there are shown, by way of example, the transitions of the individual parameters (experimental examples) with respect to the internal combustion engine 1 when the failure determination execution control shown in FIG. 7 is performed. Note that the NOx catalyst 3 used in the experimental examples is not in the deteriorated state, and the supply valve 5 is in the predefined failure state. In FIG. 7(a), the transition of the vehicle speed of a vehicle with the internal combustion engine 1 mounted thereon is shown by line L3. In FIG. 7(b), the transition of the temperature of the NOx catalyst 3 is shown by line L4, and the transition of the rate of change of the temperature thereof (i.e., the temperature change per unit time) is shown by line L5. In FIG. 7(c), the transition of the NOx removal rate calculated by making use of the detected values of the NOx sensors 7, 8 is shown by line L6. In FIG. 7(d), the transition of the adsorption amount difference at assumed failure ΔX is shown by line L7. The axis of abscissa in each view of FIG. 7 represents time, and the transition of each parameter in a common time range is illustrated.

In a period of time from time point T1 to time point T2 shown in FIG. 7(b), the temperature of the NOx catalyst 3 goes up rapidly, and in a period of time from T2 to T3, too, the NOx catalyst 3 is in the temperature rising process. As a result, it can be grasped or understood that in a predetermined period of time after the time point T1, the NOx removal rate goes up temporarily. Then, the adsorption amount difference at assumed failure will also change at very large values in comparison with the other periods of time, as shown by the line L7 in FIG. 7(d), in such a manner as to correspond to this temporary rise of the NOx removal rate. Accordingly, it is considered that in this predetermined period of time, the above-mentioned erroneous normality determination may occur due to the temporary rise of the NOx removal rate, and hence, by setting the predetermined period of time as a failure determination inhibition period (a period of time set by the processing of step S106) based on the adsorption amount difference at assumed failure, it is possible to avoid a normality determination from being made erroneously.

<Modification>

Now, reference will be made to a second example (modification) in which failure determination execution control is performed in the failure determination system of exhaust gas purification apparatus according to the present invention. In the control shown in FIG. 7, when a negative determination is made in step S104, i.e., when a determination is made that there is a possibility of erroneous normality determination, the failure determination of the exhaust gas purification apparatus 30 itself is inhibited. In this modification, however, in place of this mode (inhibition of the failure determination), the use of the detected value of the NOx sensor 8, which directly detects the NOx in the exhaust gas, may be restricted in the failure determination of the exhaust gas purification apparatus 30. In cases where the use of the detected value of the NOx sensor 8 is restricted, the amount of NOx in the exhaust gas flowing out of the NOx catalyst 3 is estimated based on the temperature of the NOx catalyst 3, the reduction efficiency of NOx in the NOx catalyst 3 estimated based on the operation history of the internal combustion engine 1, the flow rate of the exhaust gas, and so on. By alternatively making use of the amount of NOx estimated in this manner, it is possible to avoid the occurrence of erroneous normality determination due to the temporary rise of the NOx removal rate which is dependent on at least the detected value of the NOx sensor 8.

Second Example

An exhaust gas purification apparatus for an internal combustion engine, which is a target for failure determination by a failure determination system according to this second example, is as shown in FIG. 1. Then, in this second example, the failure determination of the NOx catalyst 3 included in the exhaust gas purification apparatus is performed. The failure determination of the NOx catalyst 3 is performed as follows. That is, when the NOx removal rate of the NOx catalyst 3 becomes less than a predetermined threshold value (a failure determination threshold value), a judgment is made that the exhaust gas purification apparatus 30 is in a failure state, because the reduction performance of the NOx catalyst 3 is not sufficient. Here, the NOx removal rate of the NOx catalyst 3 can be represented by the following expression.

NOx removal rate=1−(detected value of NOx sensor 8)/(detected value of NOx sensor 7)  (Expression 5)

Here, in this example, the NOx sensor 7 and the NOx sensor 8 are of the type subject to the interference of ammonia. For this reason, when ammonia molecules are contained in the exhaust gas flowing into a detection part of each of these NOx sensors, they will be detected as NOx. In consideration of this, the NOx sensor 7 is disposed upstream from the supply valve 5 at a location away therefrom to such an extent that it is not affected by the influence of the urea water supplied from the supply valve 5 into the exhaust gas. On the other hand, with respect to the NOx sensor 8, it will be affected by the influence of the ammonia which has been generated by the urea water supplied from the supply valve 5, but which has not been used for the selective reduction reaction in the NOx catalyst 3, and which has not been oxidized and removed by means of the ASC catalyst 4, (hereinafter, referred to as "slip ammonia"). In light of this, the NOx removal rate as shown by the above-mentioned expression 5 can be represented as follows.

NOx removal rate=1−(NOx flowing out from NOx catalyst+slip ammonia)/(NOx flowing into NOx catalyst)  (Expression 6)

Accordingly, when the slip ammonia is generated, the NOx sensor 8 will be subject to the influence thereof, and, as a result, the NOx removal rate will drop apparently. This will be explained below based on FIG. 9. In FIG. 9, (a) represents the NOx removal rate calculated based on the actual amounts of NOx at upstream and downstream from the NOx catalyst 3, and corresponds to the NOx removal rate calculated based on the expression 5 in the case of assuming that the NOx sensor 8 is not subject to the interference of ammonia. However, in actuality, the NOx sensor 8 is subject to the interference of ammonia, as mentioned above, and so, as shown by (b) in FIG. 9, due to the slip ammonia existing in the exhaust gas, the NOx removal rate of the NOx catalyst 3 will drop by d1, in comparison with (a). This amount of drop d1 is an amount of apparent drop, and hence, in cases where the failure determination of the NOx catalyst 3 is performed based on the NOx removal rate shown in (b), the amount of apparent drop can serve as a room of safety. Here, note that in (b) of FIG. 9, a white or void portion shows variations in the NOx removal rate resulting from individual differences with respect to the detection of the NOx sensors. Accordingly, the NOx removal rate shown by (b) in FIG. 9 means that the NOx removal rate is less than the failure determination threshold value, even if all the variations are taken into consideration.

Here, in the failure determination system of exhaust gas purification apparatus according to the present invention, which has such a characteristic with respect to the NOx removal rate, the present applicant has found out a phenomenon that an amount of ammonia slip decreases temporarily in the case of a specific transient state in which the operating state of the internal combustion engine 1 varies. The NOx removal rate calculated based on the detected value of the NOx sensor 8 is affected by the influence of slip ammonia, as shown in the above-mentioned expression 6, so that when the amount of ammonia slip decreases temporarily, the NOx removal rate will be improved in the case of the specific transient state (i.e., an amount of change d2 in a state shown by (c) in FIG. 9 corresponds to an amount of the improvement). As a result, when the variations in the NOx removal rate are taken into consideration, there arises a possibility that the calculated NOx removal rate will exceed the failure determination threshold value. This means that, even if consideration is given to the variations, as shown by (b) in FIG. 9, the NOx removal rate, which is less than the failure determination threshold value, can be judged to exceed the failure determination threshold value, depending on the variations, as shown by (c) in FIG. 9. For that reason, the NOx catalyst 3, which should originally be judged to be in a failure state, will be judged to be in a normal state without failure (deterioration), and may cause an incorrect normality determination (an erroneous normality determination).

Figure 10:
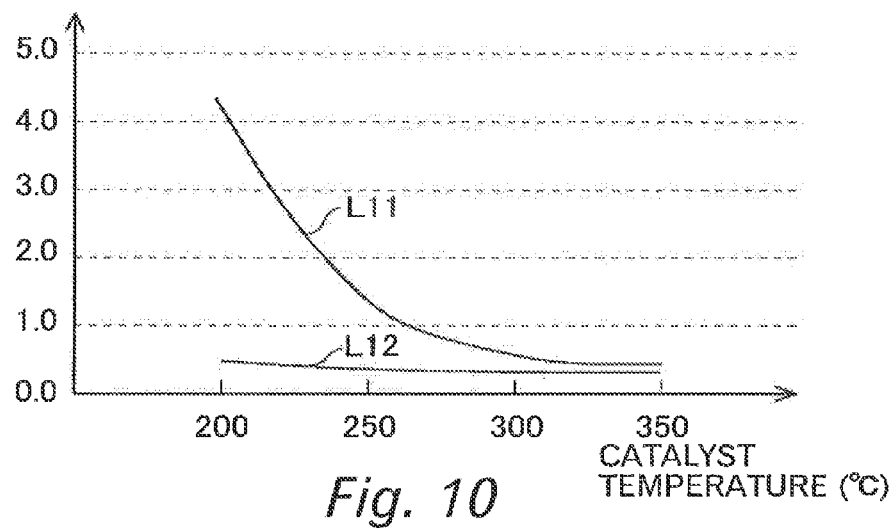
FIG. 10 is a view illustrating the correlation between the ammonia adsorption amount and the catalyst temperature in the NOx selective catalytic reduction catalyst in the second example of the present invention.

Accordingly, the specific transient state in which the above-mentioned erroneous normality determination can be caused will be explained based on FIG. 10 through FIG. 13. In FIG. 10, there is shown a correlation between the catalyst temperature in the NOx catalyst 3 and the ammonia adsorption amount in the case of an equilibrium state with respect to the adsorption of ammonia. The equilibrium state referred to herein is the to be a state in which with respect to the ammonia adsorption in the NOx catalyst, the amount of ammonia to adsorb to the carrier of the NOx catalyst and the amount of ammonia to adsorb from the carrier of the NOx catalyst 3 are in balance with each other, so that the amount of ammonia adsorbed to the carrier becomes apparently constant. This equilibrium state tends to depend on the temperature of the NOx catalyst 3 to a large extent. Specifically, in the case where the NOx catalyst 3 is in the normal state, the amount of ammonia to be adsorbed to the NOx catalyst 3 tends to decrease in accordance with the rise of the temperature of the NOx catalyst, as shown by line L11, and the extent of the decrease is relatively large. In particular, an amount of drop or decrease in the range where the temperature of the NOx catalyst is 200-250 degrees C. is more remarkable than an amount of decrease at a temperature of 250 degrees C. or above. On the other hand, in the case where the NOx catalyst 3 is in a predefined failure state, the range of variation in the ammonia adsorption amount with respect to the temperature change of the NOx catalyst 3 becomes extremely small, as shown by line L12, when expressed at the same scale as in the case where the NOx catalyst 3 is in the normal state. Here, note that the predefined failure state of the NOx catalyst 3 corresponding to the line L12 corresponds to a state in which the NOx removal rate of the NOx catalyst 3 is a little bit less than the failure determination threshold value as shown in FIG. 9, i.e., a state in which the NOx removal rate becomes a value in the vicinity of the failure determination threshold value.

Figure 11:
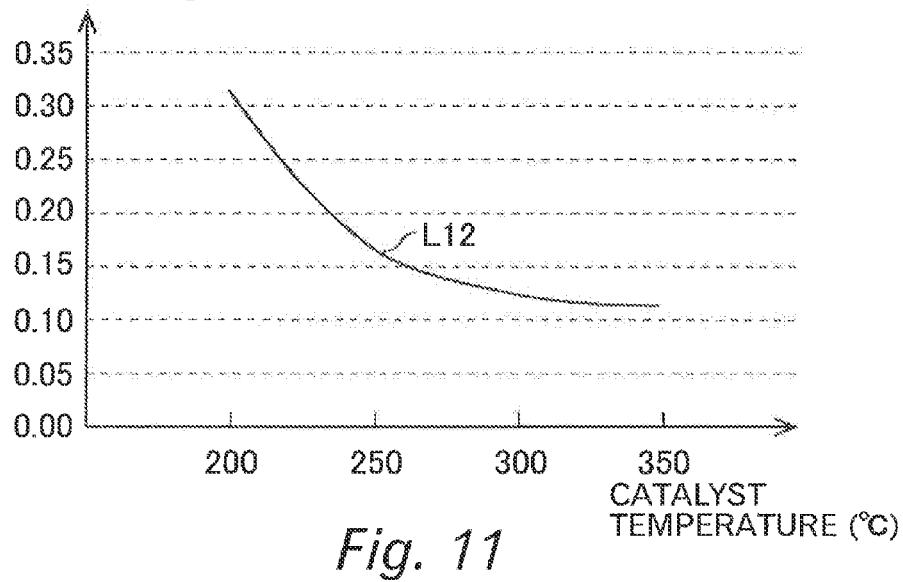
FIG. 11 is a view illustrating the correlation between the ammonia adsorption amount and the catalyst temperature in the NOx selective catalytic reduction catalyst which is in a deteriorated state, in the second example of the present invention.

However, even in the NOx catalyst 3 which is in the predefined failure state as mentioned above, when display is performed on an enlarged scale, as shown in FIG. 11 there can be found out a tendency that the ammonia adsorption amount decreases gradually as the catalyst temperature goes up, though the absolute value of the ammonia adsorption amount is small. Then, in cases where the catalyst temperature goes down in the predefined failure state in which a characteristic with respect to the ammonia adsorption amount as shown in FIG. 11 occurs, and in cases where the temperature drop is rapid, there may arise a situation in which the equilibrium state in the NOx catalyst 3 with respect to the adsorption of ammonia can be broken, as a result of which the specific transient state can be brought about in which the above-mentioned erroneous normality determination can be caused. This will be explained below with reference to FIG. 12 and FIG. 13.

Here, based on FIG. 12, a consideration will be given to the ammonia adsorption amount in the case where the catalyst temperature goes down from 250 degrees C. to 200 degrees C. in the NOx catalyst 3 which is in the predefined failure state and in the equilibrium state with respect to the adsorption of ammonia. Note that when the catalyst temperature is at 250 degrees C., it is assumed that the NOx catalyst 3 is in the equilibrium state (i.e., the state shown by point P11 (the catalyst temperature being at 250 degrees C., and the ammonia adsorption amount being X100)). In such a case, as the catalyst temperature changes from 250 degrees C. to 200 degrees C. in a gradual manner, the adsorption state of the NOx catalyst 3 defined by the catalyst temperature and the ammonia adsorption amount reaches an equilibrium state in the case where the catalyst temperature is 200 degrees C. (i.e., a state shown by point P12 (the catalyst temperature being at 200 degrees C., and the ammonia adsorption amount being X200)) through a locus corresponding to the equilibrium state specified by the line L12. In this case, the NOx catalyst 3 is always placed in the equilibrium state, so the possibility of causing a temporary variation with respect to the adsorption of ammonia is low.

However, in cases where the catalyst temperature goes down rapidly from 250 degrees C. to 200 degrees C., the adsorption of ammonia in the NOx catalyst 3 does not keep up with the rapid temperature drop, so that the adsorption state of the NOx catalyst 3 reaches a state departing to a large extent from the equilibrium state specified by the line L12, i.e., a state shown by point P13 (i.e., the catalyst temperature being at 200 degrees C., and the ammonia adsorption amount being X100). This state represented by the point P13 can be the to be a state in which even in the case of the NOx catalyst 3 being in the predefined failure state, there is left a room which can adsorb ammonia, because the drop of the catalyst temperature has been rapid (hereinafter, also referred to as an "adsorption room state"). The temperature drop to cause such an adsorption room state to occur corresponds to a temperature drop in a temperature dropping process in the present invention, and the temperature (e.g., the above-mentioned 200 degrees C.) of the NOx catalyst 3 in the temperature dropping process corresponds to a transient time catalyst temperature.

When the adsorption room state has occurred in the NOx catalyst 3 in this manner, ammonia will be adsorbed in the NOx catalyst 3 according to its capacity capable of adsorbing ammonia, as the result of which ammonia in the exhaust gas flowing out of the NOx catalyst 3 decreases temporarily. For that reason, supposing that the NOx catalyst 3 is in the predefined failure state, there will arise a possibility that the NOx removal rate exceeds the failure determination threshold value due to such a temporary decrease of ammonia, as shown in (c) in FIG. 9, and hence, there is a possibility that a judgment may be erroneously made that the NOx catalyst 3, which should originally be judged to be in a failure state (this is because the NOx catalyst 3 is in the predefined failure state), is normal (the above-mentioned erroneous normality determination). In such a case, it is preferable to refrain from the calculation of the NOx removal rate making use of the detected value of the NOx sensor 8 (i.e., the calculation based on the expression 5 and the expression 6).

Here, the above-mentioned adsorption room state of the NOx catalyst 3 will be considered and investigated in detail.

Figure 12:
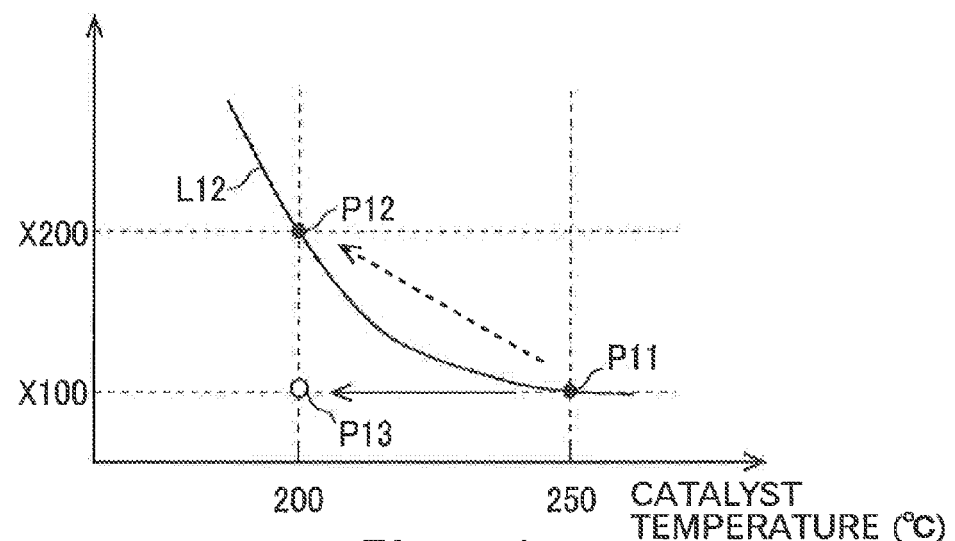
FIG. 12 is a first view for explaining the concept of an absorption amount difference at assumed deterioration adopted in a failure determination system of exhaust gas purification apparatus according to the second example of the present invention.
Figure 13:
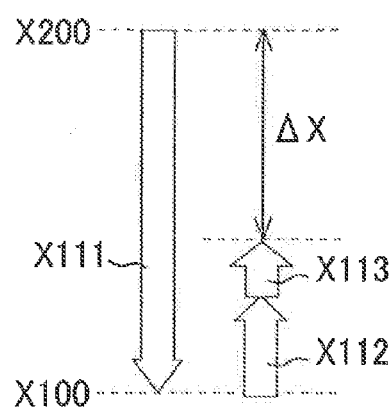
FIG. 13 is a second view for explaining the concept of the absorption amount difference at assumed deterioration adopted in the failure determination system of exhaust gas purification apparatus according to the second example of the present invention.

FIG. 13 is a view schematically illustrating an ammonia adsorption amount in the NOx catalyst 3 in which the catalyst temperature goes down rapidly and the adsorption state has reached the state shown by the point P13. A displacement of the ammonia adsorption amount shown by arrow X111 (a displacement between X200 and X100) means an amount of room for the adsorption of ammonia which has occurred due to the fact that the temperature of the NOx catalyst 3 has gone down rapidly, as shown in FIG. 12, too. Accordingly, in Hg. 13, a displacement indicated by a downward arrow is due to a factor by which the amount of room for the adsorption of ammonia is made to increase, and on the contrary, a displacement indicated by an upward arrow is due to a factor by which the amount of room for the adsorption of ammonia is made to decrease. Here, note that data has been obtained in advance through experiments or the like for the correlation between the catalyst temperature and the ammonia equilibrium adsorption amount in the case where the NOx catalyst 3 is in the predefined failure state, and the data thus obtained has been stored in the memory in the ECU 20 as a control map. Then, the ammonia equilibrium adsorption amount corresponding to the catalyst temperature can be calculated by accessing the control map.

Then, with respect to the adsorption room state of the NOx catalyst 3, it is also preferable to take into consideration the following two factors as shown below, in addition to the arrow X111. By taking these factors into consideration, the degree of the adsorption room state (the amount of room) of the NOx catalyst 3 can be grasped in a more accurate manner.

(1) Amount of Adsorption of Ammonia Resulting from the Supply of Urea Water by the Supply Valve 5

As mentioned above, with respect to the equilibrium state shown by the line L12 in FIG. 12, it is assumed that the NOx catalyst 3 is in the predefined failure state. On the other hand, the amount of urea water supplied from the supply valve 5 is controlled according to the amount of NOx in the exhaust gas flowing into the NOx catalyst 3 mainly detected by the NOx sensor 7, in such a manner that an amount of ammonia necessary for reducing and removing the amount of NOx can be adsorbed to the carrier of the NOx catalyst 3. For that reason, in the NOx catalyst 3 which is in the predefined failure state, there will exist an amount of ammonia which remains adsorbed to the carrier of the NOx catalyst 3 without being used for reduction, owing to the fact that the ability of the NOx catalyst 3 to use the supplied ammonia for reductive reaction with NOx has decreased due to deterioration thereof. That is, with the NOx catalyst 3 being in the predefined failure state, in consideration of the reduction ability of the NOx catalyst 3, there will be formed a state where ammonia has been supplied to a surplus extent.

Then, this surplus ammonia, being adsorbed to the carrier of the NOx catalyst 3, acts in a direction to diminish the amount of room for the adsorption of ammonia. Accordingly, the ammonia adsorption amount $\Delta N1$ resulting from the supply of urea water by the supply valve 5 is represented by arrow X112 in FIG. 13, and the magnitude thereof can be represented by the following expression.

$$\Delta N1 = \text{(amount of generation of ammonia generated by the supplied urea water-reference amount of supplied ammonia in the NOx catalyst 3 which is in the predefined failure state)} \times \text{gain} \quad \text{(Expression 7)}$$

Here, with respect to the amount of generation of ammonia generated by the supplied urea water, data has been obtained in advance through experiments or the like for the relation between the amount of supplied urea water and the temperature of the exhaust gas, and the data thus obtained has been stored in the memory in the ECU 20 as a control map. Then, by accessing the control map at any time, the amount of ammonia supplied to the NOx catalyst 3 can be calculated based on the amount of urea water supplied by the supply valve 5 and the temperature of the exhaust gas. In addition, "the reference amount of supplied ammonia in the NOx catalyst 3 which is in the predefined failure state" is an amount of ammonia which can be used for reductive reaction in the NOx catalyst 3 which is in the predefined failure state, and may be obtained in advance through experiments, etc. Also, the "gain" represents a ratio of how much ammonia to be adsorbed to the carrier of the NOx catalyst 3 among (with respect to) the ammonia supplied the NOx catalyst 3 to a surplus extent. In general, the ammonia adsorption amount depends to a large extent on the temperature of the NOx catalyst 3, so data has been obtained in advance through experiments or the like for the correlation between the temperature of the NOx catalyst 3 and the gain, and the data thus obtained has been stored in the memory in the ECU 20 as a control map. Then, by accessing the control map at any time, the value of the gain can be calculated based on the catalyst temperature.

(2) Decreased Amount of Ammonia Consumption Due to a Non-Equilibrium State

As mentioned above, the adsorption state in the NOx catalyst 3 shown by the point P13 can be the to be a state deviated from the equilibrium state, i.e., a non-equilibrium state. When the adsorption state of the NOx catalyst 3 reaches the non-equilibrium state due to a drop in the temperature of the NOx catalyst 3, the amount of ammonia having been adsorbed to the NOx catalyst 3 becomes small, as a result of which it is considered that the consumption amount of ammonia decreases, in comparison with the case where the NOx catalyst 3 is in the equilibrium state at the same catalyst temperature. This decreased consumption amount of ammonia acts in the direction to diminish the amount of room for the adsorption of ammonia. Thus, this decreased consumption amount of ammonia $\Delta N2$ is represented by arrow X113 in FIG. 13.

Then, with respect to the decreased consumption amount of ammonia $\Delta N2$, a control map has been built through prior experiments or the like by using, as parameters, the ammonia adsorption amount in the NOx catalyst 3 which is in the non-equilibrium state, the catalyst temperature, and the flow rate of the exhaust gas, and by associating these parameters and the decreased amount of the rate of consumption of ammonia consumed by the reductive reaction with one another, and the map thus built has been stored in the memory in the ECU 20. Then, by accessing the control map at an arbitrary time, the decreased consumption amount of ammonia $\Delta N2$ can be calculated from the above-mentioned decreased amount of the rate of consumption of ammonia and the amount of NOx in the exhaust gas flowing into the NOx catalyst 3, in the case where the NOx catalyst 3 is in a non-equilibrium state at the arbitrary time. Here, note that in considering the adsorption room state of the NOx catalyst, it is assumed that the NOx catalyst 3 is in the predefined failure state. In this case, because the reduction ability of the NOx catalyst 3 has become low due to its deterioration, the amount of ammonia consumed by the reductive reaction is small from the outset. For that reason, the decreased consumption amount of ammonia $\Delta N2$ is considered to become extremely small, and in that case, the value of the decreased consumption amount of ammonia $\Delta N2$ may be fixedly set to zero.

As described, the adsorption amount room of the NOx catalyst can be grasped in an accurate manner, by taking into consideration the above-mentioned factors, i.e., (1) the ammonia adsorption amount resulting from the amount of urea water supplied by the supply valve 5, and (2) the decreased amount of ammonia consumption due to the non-equilibrium state, with respect to the amount of room (X200-X100) for the adsorption of ammonia resulting from the temperature drop. In the example shown in FIG. 13, the ammonia adsorption amount $\Delta X$, which is obtained by subtracting the magnitudes of the arrow X112 and the arrow X113 from the magnitude of the arrow X111, corresponds to a final adsorption amount room of the NOx catalyst 3. Then, the adsorption amount room indicated by $\Delta X$ is an adsorption amount room when assuming that the NOx catalyst 3 is in the predefined failure state, i.e., a displacement (difference) of the ammonia adsorption amount with respect to the equilibrium state, and hence, $\Delta X$ is referred to as an "adsorption amount difference at assumed failure". Accordingly, it is suggested or mentioned that in cases where the adsorption amount difference at assumed failure has occurred to some extent in the NOx catalyst 3, when failure determination based on the NOx removal rate using the detected value of the NOx sensor 8 is performed, there is a possibility that normality determination is erroneously made, though it should be determined that the NOx catalyst 3 is in the failure state (i.e., in the predefined failure state).

Figure 14:
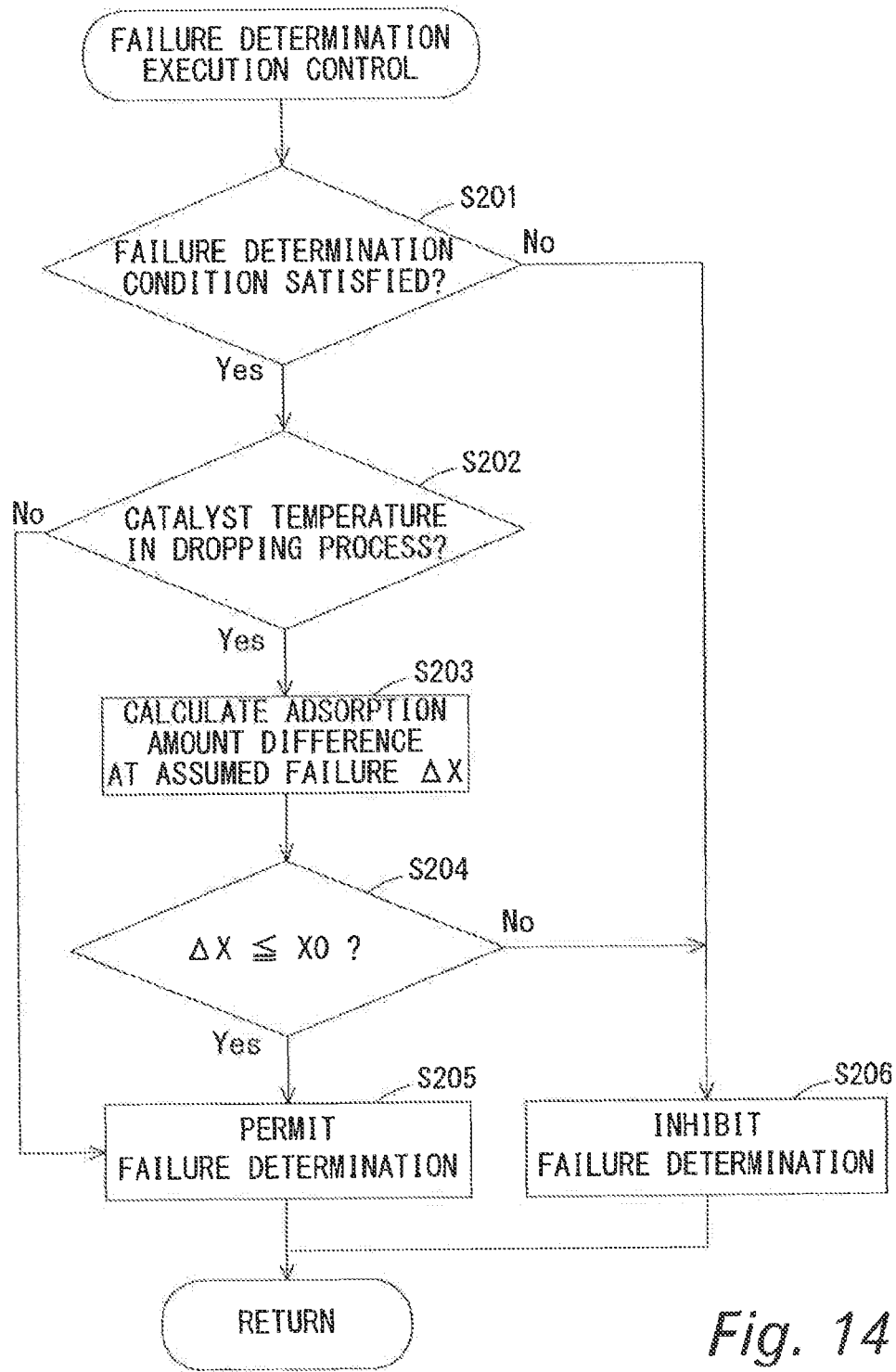
FIG. 14 is a flow chart with respect to the execution control of failure determination of the NOx selective catalytic reduction catalyst performed in the failure determination system of exhaust gas purification apparatus according to the second example of the present invention.

Accordingly, in cases where there is such a possibility, it is preferable to apply a certain restriction to the above-mentioned failure determination based on the NOx removal rate, so that erroneous normality determination is not performed. Based on the above, in this second example, failure determination execution control is performed with respect to the failure determination of the NOx catalyst 3, as shown in FIG. 14. That control is performed by execution of a control program stored in the ECU 20.

First, in step S201, it is determined whether a condition for performing the failure determination of the NOx catalyst 3 based on the NOx removal rate calculated according to the expression 5 and the expression 6 is satisfied. As one example of such a condition, there is mentioned whether the temperature of the NOx catalyst 3 has exceeded a catalyst temperature for the catalyst 3 to be in an activated state, or whether the temperatures of the NOx sensors 7, 8 has gone up to a temperature at which they can perform NOx detection, or the like. The temperature of the NOx catalyst 3 can be estimated based on the detected value of the temperature sensor 9, and the temperatures of the NOx sensors 7, 8 can be estimated based on an elapsed period of time after the internal combustion engine 1 has started to warm up, etc. When an affirmative determination is made in step S201, the control program or routine goes to step S202, whereas when a negative determination is made, the routine goes to step S206.

Then, it is determined whether the temperature of the NOx catalyst 3 is in a relatively rapid temperature dropping process in which it changes from the point P11 to the point P13 as shown in FIG. 12, i.e., it deviates from an equilibrium state with respect to the adsorption of ammonia in the NOx catalyst 3. For example, in cases where the rate of drop (the speed of drop) of the temperature of the NOx catalyst 3 becomes equal to or higher than a predetermined value, an affirmative determination is made that the temperature of the NOx catalyst 3 is in the relatively rapid dropping process, and the routine goes to step S203. On the other hand, when a negative determination is made in step S202, the temperature drop of the NOx catalyst 3 is relatively gradual, so it means that it is possible to maintain a substantially equilibrium state. Accordingly, in that case, the processing or routine goes to step S205.

Subsequently, in step S203, the adsorption amount difference at assumed failure $\Delta X$ shown in FIG. 13 is calculated with respect to the NOx catalyst 3 which is in the temperature dropping process. In this example, as stated above, the adsorption amount difference at assumed failure ΔX is calculated by taking into consideration the ammonia adsorption amount resulting from the supply of urea water by the supply valve 5, and the dropped or decreased amount of ammonia consumption due to the non-equilibrium state, with respect to the amount of room for the adsorption of ammonia resulting from the temperature drop. Here, note that in order to make simple the calculation of the adsorption amount difference at assumed failure ΔX, a value of the amount of room for the adsorption of ammonia resulting from the temperature drop (i.e., a displacement of the ammonia adsorption amount corresponding to the arrow X111 shown in FIG. 13) may also be used as the adsorption amount difference at assumed failure ΔX.

In step S204, it is determined whether the difference adsorption amount at assumed failure ΔX calculated in step S203 is equal to or less than a predetermined threshold value X0. The predetermined threshold value X0 is set, based on the above-mentioned erroneous normality determination resulting from the fact that a temporary drop in the amount of ammonia slip, which will occur when the adsorption amount difference at assumed failure ΔX becomes large, will make the NOx removal rate apparently large, by taking into consideration the correlation between the magnitude of the adsorption amount difference at assumed failure ΔX and the possibility of the occurrence of erroneous normality determination. Accordingly, when an affirmative determination is made in step S204, the value of the adsorption amount difference at assumed failure ΔX is adequately low, and so the possibility of the erroneous normality determination is also low, as a result of which the execution of the failure determination of the NOx catalyst 3 based on the NOx removal rate is accordingly permitted (processing in step S205). On the other hand, when a negative determination is made in step S204, the value of the adsorption amount difference at assumed failure ΔX is relatively high, and so the possibility of the erroneous normality determination is also high, as a result of which the execution of the failure determination of the NOx catalyst 3 based on the NOx removal rate is accordingly inhibited (processing in step S206). When the processing in step S205 or the processing in step S206 is performed, the processing in step S201 is repeated again.

Here, in FIG. 15, there are shown, by way of example, the transitions of the individual parameters (experimental examples) with respect to the internal combustion engine 1 when the failure determination execution control shown in FIG. 14 is performed. Note that the NOx catalyst 3 used in the experimental examples is in the predefined failure state. In FIG. 15(a), the transition of the vehicle speed of a vehicle with the internal combustion engine 1 mounted thereon is shown by line L13. In FIG. 15(b), the transition of the temperature of the NOx catalyst 3 is shown by line L14, and the transition of the temperature of the ASC catalyst 4 is shown by line L15. In FIG. 15(c), the transition of the amount of ammonia contained in the exhaust gas (the amount of ammonia slip), which flows out of the NOx catalyst 3 and the ASC catalyst 4, and to which the NOx sensor 8 is exposed, is shown by line L16. Also, the transition of the amount of ammonia slip when the adsorption of ammonia in the NOx catalyst 3 is in an equilibrium state is shown by line L17. In FIG. 15(d), the transition of the NOx removal rate calculated by making use of the detected values of the NOx sensors 7, 8 is shown by line L18. In FIG. 15(e), the transition of the adsorption amount difference at assumed failure ΔX is shown by line L19. The axis of abscissa in each view of FIG. 15 represents time, and the transition of each parameter in a common time range is illustrated.

In a period of time from time point T11 to time point T12 shown in FIG. 15(b), the temperature of the NOx catalyst 3 goes down rapidly, and in a period of time from T12 to T13, too, the NOx catalyst 3 is in the temperature dropping process. As a result, it can grasped or understood that in a fixed period of time from a vicinity of T12, the actual amount of ammonia slip (shown by the line L16) is less than the amount of ammonia slip (shown by the line L17) in the NOx catalyst which is in the equilibrium state, as a result of which the NOx removal rate goes up temporarily. In this fixed period of time, the adsorption amount difference at assumed failure will change at very large values in comparison with the other periods of time, as shown by the line L19 in FIG. 15(e). Accordingly, it is considered that in this fixed period of time, the above-mentioned erroneous normality determination may occur, and hence, by setting the fixed period of time as a failure determination inhibition period (a period of time set by the processing of step S208), it is possible to avoid a normality determination from being made erroneously.

<Modification>

Now, reference will be made to a second example (modification) in which failure determination execution control is performed in the failure determination system of exhaust gas purification apparatus according to the present invention. In the control shown in FIG. 14, when a negative determination is made in step S204, i.e., when a determination is made that there is a possibility of erroneous normality determination, the failure determination of the NOx catalyst 3 itself is inhibited. In this modification, however, in place of this mode (inhibition of the failure determination), the use of the detected value of the NOx sensor 8, which is a cause of the temporary rise of the NOx removal rate resulting from the adsorption amount difference at assumed failure ΔX, may be restricted in the failure determination of the NOx catalyst 3. In cases where the use of the detected value of the NOx sensor 8 is restricted, the amount of NOx in the exhaust gas flowing out of the NOx catalyst 3 is estimated based on the temperature of the NOx catalyst 3, the reduction efficiency of NOx in the NOx catalyst 3 estimated based on the operation history of the internal combustion engine 1, the flow rate of the exhaust gas, and so on. By alternatively making use of the amount of NOx estimated in this manner, it is possible to avoid the occurrence of erroneous normality determination due to the temporary rise of the NOx removal rate which is dependent on at least the detected value of the NOx sensor 8.

REFERENCE SIGNS LIST

1: internal combustion engine
2: exhaust passage
3: NOx selective catalytic reduction catalyst (NOx catalyst)
4: ASC catalyst
5: supply valve
7, 8: NOx sensor
9: temperature sensor
11: crank position sensor
12: accelerator opening sensor
20: ECU
30: exhaust gas purification apparatus

The invention claimed is:
1. A failure determination system of exhaust gas purification apparatus comprising:
a NOx selective catalytic reduction catalyst that is disposed in an exhaust passage of an internal combustion engine and uses ammonia as a reducing agent;
a reducing agent supply unit that supplies ammonia or a precursor of ammonia into exhaust gas flowing into the

NOx selective catalytic reduction catalyst at a location upstream from the NOx selective catalytic reduction catalyst; and a NOx sensor that is disposed downstream from the NOx selective catalytic reduction catalyst and detects NOx in exhaust gas flowing out of the NOx selective catalytic reduction catalyst, wherein the failure determination system of exhaust gas purification apparatus further comprises an electronic control unit configured to:

perform failure determination of the exhaust gas purification apparatus based on a detected value of the NOx sensor;

provide an indication to a vehicle operator when the exhaust gas purification apparatus is determined to be in a predefined failure state;

calculate an adsorption amount difference at assumed failure, the adsorption amount difference at assumed failure being a difference between an ammonia equilibrium adsorption amount in the NOx selective catalytic reduction catalyst in an equilibrium state of ammonia adsorption, assuming that the exhaust gas purification apparatus is in the predefined failure state, and an actual ammonia adsorption amount in the NOx selective catalytic reduction catalyst; and restrict use of the detected value of the NOx sensor in the failure determination or inhibit the failure determination itself, when the calculated adsorption amount difference at assumed failure exceeds a predetermined value.

2. A failure determination system of exhaust gas purification apparatus as set forth in claim 1, wherein the electronic control unit is further configured to:

perform failure determination of the reducing agent supply unit of the exhaust gas purification apparatus based on the detected value of the NOx sensor; and calculate the adsorption amount difference at assumed failure under an assumption that the reducing agent supply unit of the exhaust gas purification apparatus is in the predefined failure state, and is in a condition where the actual ammonia adsorption amount in the NOx selective catalytic reduction catalyst becomes greater than the ammonia equilibrium adsorption amount.

3. A failure determination system of exhaust gas purification apparatus as set forth in claim 2, wherein the electronic control unit is further configured to perform failure determination based on a NOx removal rate of the NOx selective catalytic reduction catalyst calculated from the detected value of the NOx sensor and an amount of NOx in the exhaust gas flowing into the NOx selective catalytic reduction catalyst; and the predefined failure state is a failure state being set corresponding to a threshold value of the NOx removal rate used when it is determined that the reducing agent supply unit is in failure.

4. A failure determination system of exhaust gas purification apparatus as set forth in claim 3, wherein the electronic control unit is further configured to calculate the adsorption amount difference at assumed failure based at least on an absorption amount difference between an actual ammonia adsorption amount in the NOx selective catalytic reduction catalyst corresponding to a transient time catalyst temperature, the transient time catalyst temperature being a temperature of the NOx selective catalytic reduction catalyst in a temperature rising process, and the equilibrium adsorption amount in the NOx selective catalytic reduction catalyst corresponding to the transient time catalyst temperature.

5. A failure determination system of exhaust gas purification apparatus as set forth in claim 4, wherein the electronic control unit is further configured to calculate the adsorption amount difference at assumed failure based further on at least one of:

a surplus ammonia adsorption amount that is an amount of ammonia overly adsorbed to the NOx selective catalytic reduction catalyst attributed to a surplus reducing agent of a reducing agent supplied from the reducing agent supply unit;

a consumed ammonia increased amount that is an increased amount of an ammonia consumption amount for NOx reduction in the NOx selective catalytic reduction catalyst being at the transient time catalyst temperature from an ammonia consumption amount for NOx reduction in the NOx selective catalytic reduction catalyst being in an equilibrium state with respect to ammonia adsorption; and an ammonia desorption amount that is an amount of ammonia desorbed from the NOx selective catalytic reduction catalyst.

6. A failure determination system of exhaust gas purification apparatus as set forth in claim 2, wherein the electronic control unit is further configured to calculate the adsorption amount difference at assumed failure based at least on an absorption amount difference between an actual ammonia adsorption amount in the NOx selective catalytic reduction catalyst corresponding to a transient time catalyst temperature, the transient time catalyst temperature being a temperature of the NOx selective catalytic reduction catalyst in a temperature rising process, and the equilibrium adsorption amount in the NOx selective catalytic reduction catalyst corresponding to the transient time catalyst temperature.

7. A failure determination system of exhaust gas purification apparatus as set forth in claim 6, wherein the electronic control unit is further configured to calculate the adsorption amount difference at assumed failure based further on at least one of:

a surplus ammonia adsorption amount that is an amount of ammonia overly adsorbed to the NOx selective catalytic reduction catalyst attributed to a surplus reducing agent of a reducing agent supplied from the reducing agent supply unit;

a consumed ammonia increased amount that is an increased amount of an ammonia consumption amount for NOx reduction in the NOx selective catalytic reduction catalyst being at the transient time catalyst temperature from an ammonia consumption amount for NOx reduction in the NOx selective catalytic reduction catalyst being in an equilibrium state with respect to ammonia adsorption; and an ammonia desorption amount that is an amount of ammonia desorbed from the NOx selective catalytic reduction catalyst.

8. A failure determination system of exhaust gas purification apparatus as set forth in claim 1, wherein the NOx sensor is a sensor that also detects ammonia in the exhaust gas as NOx; and the electronic control unit is further configured to:

perform failure determination with respect to deterioration of the NOx selective catalytic reduction catalyst of the exhaust gas purification apparatus based on the detected value of the NOx sensor; and calculate the adsorption amount difference at assumed failure under an assumption that the NOx selective catalytic reduction catalyst of the exhaust gas purification apparatus is in the predefined failure state and is in a condition where the actual ammonia adsorption amount in the NOx selective catalytic reduction catalyst becomes smaller than the ammonia equilibrium adsorption amount in a process in which the temperature of the NOx selective catalytic reduction catalyst is dropping.

9. A failure determination system of exhaust gas purification apparatus as set forth in claim 8, wherein
the electronic control unit is further configured to perform failure determination based on a NOx removal rate of the NOx selective catalytic reduction catalyst calculated from the detected value of the NOx sensor and an amount of NOx in the exhaust gas flowing into the NOx selective catalytic reduction catalyst; and
the predefined failure state is a failure state being set corresponding to a threshold value of the NOx removal rate used when it is determined that the reducing agent supply unit is in failure.

10. A failure determination system of exhaust gas purification apparatus as set forth in claim 9, wherein
the electronic control unit is further configured to calculate the adsorption amount difference at assumed failure based at least on an absorption amount difference between an ammonia adsorption amount in the NOx selective catalytic reduction catalyst corresponding to a transient time catalyst temperature, the transient time catalyst temperature being a temperature of the NOx selective catalytic reduction catalyst in a temperature dropping process, and the equilibrium adsorption amount in the NOx selective catalytic reduction catalyst corresponding to the transient time catalyst temperature.

11. A failure determination system of exhaust gas purification apparatus as set forth in claim 10, wherein
the electronic control unit is further configured to calculate the adsorption amount difference at assumed failure based further on at least one of:
a surplus ammonia adsorption amount that is an amount of ammonia overly adsorbed to the NOx selective catalytic reduction catalyst attributed to a surplus reducing agent of a reducing agent supplied from the reducing agent supply unit; and
a consumed ammonia decreased amount that is a decreased amount of an ammonia consumption amount for NOx reduction in the NOx selective catalytic reduction catalyst being at the transient time catalyst temperature from an ammonia consumption amount for NOx reduction in the NOx selective catalytic reduction catalyst being in an equilibrium state with respect to ammonia adsorption.

12. A failure determination system of exhaust gas purification apparatus as set forth in claim 11, wherein
the consumed ammonia decreased amount is set to zero.

13. A failure determination system of exhaust gas purification apparatus as set forth in claim 8, wherein
the electronic control unit is further configured to calculate the adsorption amount difference at assumed failure based at least on an absorption amount difference between an ammonia adsorption amount in the NOx selective catalytic reduction catalyst corresponding to a transient time catalyst temperature, the transient time catalyst temperature being a temperature of the NOx selective catalytic reduction catalyst in a temperature dropping process, and the equilibrium adsorption amount in the NOx selective catalytic reduction catalyst corresponding to the transient time catalyst temperature.

14. A failure determination system of exhaust gas purification apparatus as set forth in claim 13, wherein
the electronic control unit is further configured to calculate the adsorption amount difference at assumed failure based further on at least one of:
a surplus ammonia adsorption amount that is an amount of ammonia overly adsorbed to the NOx selective catalytic reduction catalyst attributed to a surplus reducing agent of a reducing agent supplied from the reducing agent supply unit, the surplus reducing agent being surplus corresponding to the predefined failure state; and
a consumed ammonia decreased amount that is a decreased amount of an ammonia consumption amount for NOx reduction in the NOx selective catalytic reduction catalyst being at the transient time catalyst temperature from an ammonia consumption amount for NOx reduction in the NOx selective catalytic reduction catalyst being in an equilibrium state with respect to ammonia adsorption.

15. A failure determination system of exhaust gas purification apparatus as set forth in claim 14, wherein
the consumed ammonia decreased amount is set to zero.

* * * * *